US011317136B2

(12) United States Patent
Liu et al.

(10) Patent No.: US 11,317,136 B2
(45) Date of Patent: Apr. 26, 2022

(54) REMOTE CONTROLLER NAVIGATION INTERFACE ASSEMBLY

(71) Applicant: Home Control Singapore Pte Ltd, Singapore (SG)

(72) Inventors: Qiang Liu, Suzhou (CN); Whye Kwong Liang, Singapore (SG); Ching Guan Tay, Singapore (SG); Hon Shien Choong, Singapore (SG); Simin He, Singapore (SG)

(73) Assignee: HOME CONTROL SINGAPORE PTE LTD, Singapore (SG)

( * ) Notice: Subject to any disclaimer, the term of this patent is extended or adjusted under 35 U.S.C. 154(b) by 1 day.

(21) Appl. No.: 17/018,537

(22) Filed: Sep. 11, 2020

(65) Prior Publication Data

US 2021/0144429 A1    May 13, 2021

(30) Foreign Application Priority Data

Sep. 11, 2019 (CN) .......................... 201910862545.6

(51) Int. Cl.
*H04N 21/422* (2011.01)
*G06F 3/044* (2006.01)
*H04N 21/431* (2011.01)

(52) U.S. Cl.
CPC ....... *H04N 21/42224* (2013.01); *G06F 3/044* (2013.01); *H04N 21/4312* (2013.01)

(58) Field of Classification Search
CPC .......... H04N 21/42224; H04N 21/4312; G06F 3/044
See application file for complete search history.

(56) References Cited

U.S. PATENT DOCUMENTS

| 5,744,765 | A  | * | 4/1998 | Yamamoto ............. G05G 9/047 200/339 |
|---|---|---|---|---|
| 8,421,602 | B2 |   | 4/2013 | Madonna et al. |
| 8,572,509 | B2 |   | 10/2013 | Gobeil |
| 8,869,068 | B2 |   | 10/2014 | Primiani et al. |
| 9,007,302 | B1 |   | 4/2015 | Bandt-Horn |
| 9,021,398 | B2 |   | 4/2015 | Kotler et al. |
| 9,582,187 | B2 |   | 2/2017 | Gil et al. |

(Continued)

OTHER PUBLICATIONS

Search Report issued in European Patent Application No. 20195691, dated Feb. 3, 2021.

*Primary Examiner* — Oschta I Montoya
(74) *Attorney, Agent, or Firm* — Foley & Lardner LLP

(57) ABSTRACT

An apparatus for interacting with a graphical user interface, including: a printed circuit board, a plurality of push detection elements disposed on or over the top surface of the printed circuit board, wherein four push detection elements are arranged orthogonally from each other in the cardinal directions, a flexible pad layer disposed on or over the plurality of push detection elements, a navigation key disposed over and covering the four push detection elements, wherein the bottom surface of the navigation key has an annular-shaped cavity, four plungers, each one of the four plungers disposed above a respective one of the four push detection elements and configured to actuate a respective push detection element when a corresponding plunger is actuated, and at least one post disposed in an angular region between two plungers of adjacent cardinal directions.

13 Claims, 45 Drawing Sheets

(56) References Cited

U.S. PATENT DOCUMENTS

| | | |
|---|---|---|
| 10,198,148 B2 | 2/2019 | Shaw |
| 2001/0006143 A1* | 7/2001 | Sato ............... H01H 25/041 |
| | | 200/6 A |
| 2004/0160235 A1* | 8/2004 | Okada ............ H03K 17/975 |
| | | 324/681 |
| 2007/0257886 A1* | 11/2007 | Uotani ............ H01H 25/041 |
| | | 345/160 |
| 2009/0083665 A1 | 3/2009 | Anttila et al. |
| 2016/0195428 A1* | 7/2016 | McRae ............ G02F 1/1368 |
| | | 348/734 |
| 2016/0261903 A1* | 9/2016 | Epstein .......... H04N 21/42221 |
| 2017/0038928 A1 | 2/2017 | Park et al. |
| 2017/0263114 A1* | 9/2017 | Yoon .............. H05K 5/0217 |
| 2020/0026424 A1* | 1/2020 | Maier ............ G06F 3/04886 |

* cited by examiner

FIG. 12D
FIG. 12F
FIG.
12G →
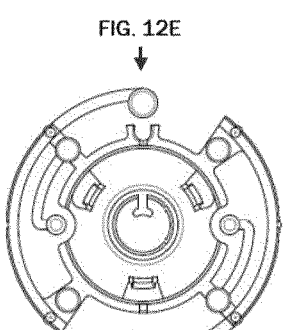
FIG. 12E ↓
← FIG.
12F
FIG. 12G
↑ FIG. 12D
FIG. 12E Section B-B Section A-A Section C-C

REMOTE CONTROLLER NAVIGATION INTERFACE ASSEMBLY

TECHNICAL FIELD

Various aspects of this disclosure generally relate to human-computer interaction, and more particularly, to a more intuitive user interface to navigate an onscreen menu without needing the user to remember complicated steps or perform repeated button presses.

BACKGROUND

The convergence of computing and entertainment continues to provide new contents, options and interactivity for consumers. Access to World Wide Web via media client devices such as Internet-enabled Smart television (Smart TV), Internet Protocol television (IPTV), digital Set Top Box (STB) or Over-The-Top (OTT) box is becoming increasingly popular. For example, cable subscribers can now access cable television programs and video-on-demand media content (VOD) through their set-top boxes. A Smart TV is able to process various functions such as VOD, applications (e.g., photos, videos, music, games, banking, shopping, etc.), and information search as well as the functions of a conventional channel TV or IPTV. On-demand media content includes visual content (e.g. movies, television shows, still images), audio content (e.g. music), and software applications (e.g. games). Other sources of content may also exist, including content from a media library, an Internet Protocol (IP) stream, a Web site, etc.

All of these media client devices, with varying levels of sophistication, have memory, a central processing unit (CPU) and video-graphics capabilities similar to those of a personal computer. That is, while a personal computer can execute a computer program generating a display to a computer monitor, any of these devices can run a computer program that generates a display to a television, often allowing a consumer to interact with the program via, for example, a remote controller.

Unfortunately, despite technological advances, user interfaces for these systems have remained largely unchanged, making navigation through all of the newly available options a tedious task. For example, a user must browse through potentially hundreds of channels and other options, often by repeatedly pressing a button on a remote controller. Such an outdated approach is far too slow and inconvenient to facilitate effective operation of a modern media application system.

Modern media client devices typically provide access to a plurality of selectable options, such as channels, programs, applications, digital media files, etc. For instance, media client devices such as Internet-enabled Smart television (Smart TV), Internet Protocol television (IPTV), digital Set Top Box (STB) or Over-The-Top (OTT) box may provide access to literally hundreds of broadcast TV channels, video-on-demand (VOD), music channels, applications, including web browsers, and the like. In order to select and control these various functions, remote controllers with more than 20 buttons having multiple functions are usually used. A user often has difficulty becoming familiar with the different functions of buttons among such remote controllers. Frequently, a user may have to press one button at least 10 times to search for VOD content. As such these remote controllers have lost their original purpose of allowing users to easily and quickly execute a desired function with a few gestures.

Other menu navigation systems may include, and the user to operate, complicated controller mechanisms. These controller mechanisms often include, for example, touchpad, optical track pad, trackballs, and motion sensor for controlling a moving cursor displayed on display of a personal computer. Such controllers may be too unwieldly for operating media client devices. For example, selecting a menu by moving a cursor displayed on television would require more accuracy and good hand-eye coordination due to the increased distance between the user and the display. This type of interface would frustrate a user who would like to select a function with a gesture or two. The frustration may cause the user to eventually stop using many of the functions provided by media client devices.

Designers of graphical user interfaces have sought to create menus that are easy to use and are capable of presenting a varying number of options in an efficient and visually interesting manner. Some design considerations have been on how to simultaneously display a large number of options, how to treat hierarchically related menu levels, how to identify user selections, and the like.

One common menu type is the "cascading" menu, which is ubiquitous in the personal computer art (e.g., the Windows® "Start" menu). In general, a cascading menu presents a columnar list of options from which a user may select. Once an option is selected, a second list of options may be displayed, typically to the right of, and below, the first list of options. In response to further selections, additional lists may be displayed that cascade down and to the right of previous lists until a last option level is reached.

Unfortunately, because cascading menus are so common, users do not generally perceive them to be visually interesting or entertaining. Moreover, cascading menus often make poor use of display space. Typically, all of the options are clustered together on one side, for example, the left side of the display, while the right side of the display is comparatively empty. In some cases, options may not be displayed fully because the menu is too long to fit on the display screen, requiring the user to scroll down and re-navigate the menu.

Cascading menus can also make it difficult to determine the sequence of selections (i.e. the "selection path") that was taken to the currently selected option. Trying to identify options that might have been selected may be difficult and/or confusing. Users of these cascading menu systems can quickly become lost, having lost track of how many menus deep they are in the cascade. It also may be frustrating to figure out how to get to a desired menu, which may be in a different cascade pathway. This may lead to frustration and general dissatisfaction with the device.

A radial menu user interface (UI) (also referred to as a circular or pie menu UI) generally includes a circular layout design in contrast to the more conventional cascading or linear menu UI paradigm. The layout and navigation of linear menu UI and radial menu UI are significantly different, and both paradigms have advantages, disadvantages, and user appeal. Radial menus offer a distinct and wholly different visual and use experience as compared to linear menus. Linear menu UIs are typically located away from a user's current focus and are not always relevant contextually. However, acceptance of radial menu UIs continues to lag behind the more traditional linear menu paradigm.

Some radial menu UIs can be excessively cluttered, disorienting, and/or provide sub-optimal use experiences. For example, due in part to the more limited available display area for menu controls within a circular area, developers may attempt to put too many controls or options in each pie or wedge slice, resulting in smaller click targets which can lead to increased input errors and mistakes. Radial menu parameters such as item density, item spacing, item shapes, etc. have a direct influence on the usability and acceptance of a radial menu UI.

Moreover, a traditional navigation keypad on remote controller is intended for use with linear menu UIs to allow Up, Down, Left and Right movement. Using this traditional navigation keypad in tandem with radial menu UIs may cause "false actuation" or "double-actuation" when attempting to select an option/menu item associated with a pie sector or wedge slice. "Double-actuation" happens when a user has intended to select a particular menu item on the menu but "accidentally" activates a neighboring option instead due to the structure of traditional navigation keypad.

Accordingly, a radial menu user interface that allows for rapid and efficient navigation of a plurality of options without the drawbacks of conventional approaches is desired. In particular, a menu interface in which a user need not repeatedly press a button to display each available option is desired. Likewise, a menu interface in which a user need not browse through and memorize an arrangement of multiple icons is desired.

Accordingly, what is needed is a simple and intuitive radial menu UI that makes efficient use of display space and is more entertaining and visually interesting than standard cascading menus. What is also needed is a radial menu UI that clearly delineates the selection path taken by a user. What is also needed is a remote controller that works seamlessly to complement the radial menu UIs to enable a user navigates the menu and content browsing efficiently and intuitively.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

This disclosure describes an apparatus and a method for a radial graphical user interface (UI). This disclosure also describes a way of preventing spurious inputs from a navigational pad of a remote controller unit.

In an aspect of the disclosure, a remote controller that works in tandem with radial menu UI to allow seamless navigation and selection of user's choice is provided. The apparatus may include: a printed circuit board, a plurality of push detection elements disposed on or over the top surface of the printed circuit board, wherein four push detection elements are arranged orthogonally from each other in the cardinal directions, a flexible pad layer disposed on or over the plurality of push detection elements, a navigation key disposed over and covering the four push detection elements, wherein the bottom surface of the navigation key has an annular-shaped cavity, four plungers, each one of the four plungers disposed above a respective one of the four push detection elements and configured to actuate a respective push detection element when a corresponding plunger is actuated, and at least one post disposed in an angular region between two plungers of adjacent cardinal directions.

To the accomplishment of the foregoing and related ends, the one or more aspects include the features hereinafter fully described and particularly pointed out in the claims. The following description and the associated drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 12B-12G are diagrams corresponding to a top view, a bottom view, and various side views, respectively, of the example cursor guide element illustrated in FIG. 12A.

DETAILED DESCRIPTION

Figure 1:
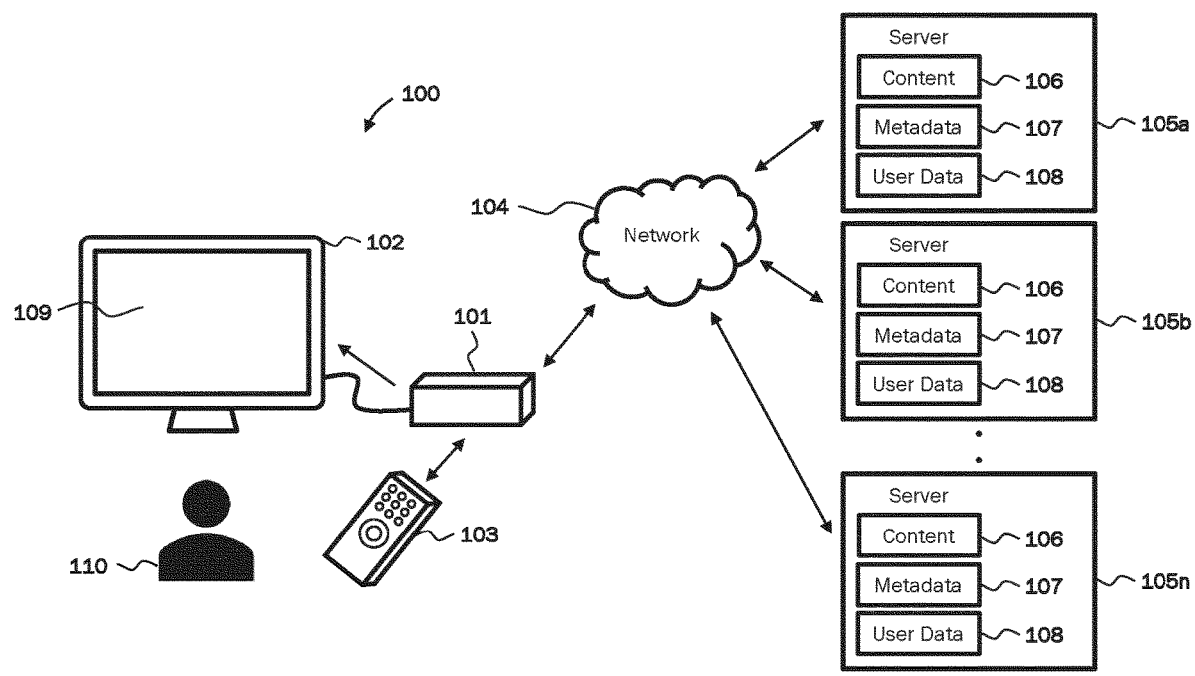
FIG. 1 is a block diagram illustrating an example networked environment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a graphical user interface will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

This disclosure describes a system, apparatus, and method for providing and interacting with a navigational interface that is a software component that executes on a client terminal to generate dynamic screen images for display to a consumer or viewer. The navigational interface provides an on-screen interface for the viewer to access, personalize settings, and order on-demand contents, and services (such as web browsing) through a media client device. The viewer interacts with the menu user interface of media client device displayed on a display (such as TV) through an input device such as a remote controller. Based on the viewer's interaction, the navigational interface modifies the TV display and may communicate across a distribution network to provide the media contents, information, applications, and services to the viewer.

While the following description makes particular reference to Interactive TV (ITV) systems, it should be recognized that the graphical user interface described herein may be used in conjunction with any type of information or entertainment system in which navigational interface may be displayed on a display screen. Examples of such systems include, but not limited to, personal computers, and mobile computing devices, such as smart phone, tablet computing device, and the like.

FIG. 1 is a block diagram of an example networked environment where embodiments of the present disclosure may be implemented. Networked environment 100 includes interactivity common to most media streaming systems. Networked environment 100 may include a topology of servers, clients, Internet service providers, and communication media. For example, the networked environment 100 may include a media client device 101 (e.g., a streaming media player, streaming stick, cable or satellite STB, OTT box, IPTV box etc.), a display device 102 (e.g. a television (TV)), a user device 103 (e.g., remote control), a network 104 (e.g., WiFi, Internet), and a plurality of servers 105a-105n operatively connected to each other.

The network 104 can include, for example, without limitation, wired and/or wireless intranet, extranet, Internet, cellular, fiber, coaxial, Ethernet, Wi-Fi, Bluetooth and/or any other short range, long range, local, regional global communication networks, as well as any combination thereof. The media client device 101 may be preloaded with streaming applications from different streaming platforms such as Netflix®, HBO NOW®, and Roku® channels. The media client device 101 and display device 102 may be consolidated into a single device, e.g. Internet enabled smart TV. In some embodiments, a media client device 101 may be integrated with, operatively coupled to, and/or connected to their respective display device 102, user device 103, and/or network 104. A media client device may aurally and/or graphically present User Interface (UI) views, UI elements and/or content on display device. A streaming application executing on a media client device 101 may communicate with one or more content servers 105a-105n via network 104 to request and receive streaming program or content to be displayed on display device 102.

The user device 103 may be configured to communicate user input information with media client device 101. In some embodiments, a user device 103 may include a touch screen display (not shown). A user device 103 may take the form of handheld device such as a remote controller with wireless interface such as Bluetooth (BT), Radio Frequency (RF), and Infrared (IR), or smart phone, tablet or mobile computing device. A user device may be further configured to enable a user to navigate and/or make user selections, search for contents, and/or ongoing interaction with application and/or UI views presented on display device. Additionally, or alternatively, a user device may be configured to present at least a portion of UI views on a touch screen display (not shown) to enable a user to navigate, select, or otherwise interact with various contents.

Content servers 105a-105n may each include, for example, without limitation, a database to store content 106, metadata 107 and user data 108. Content 106 may include any combination of videos, movies, TV programs, music, images, multimedia, pictures, text, graphics, gaming applications, advertisement, software application and/or any data objects in electronic form. Metadata 107 includes information about content 106. For example, metadata 107 may include associated information related to director, actor, artist, summary, trailers, genre, and/or any ancillary information pertaining to the content 106. Metadata 107 is useful for content discovery, recommendation and intuitive user experience. User data 108 may include customer specific information such as user profile information, user login, preferences, usage history, demographic data, geographical data, ISP identification, and/or financial information. The content servers 105 may generate customized user interfaces for each media client device 101 based on part or more elements of user data 108.

A display device 102 may be configured to display a navigable menu or user interface dashboard 109 for a user 110 to navigate, browse, select and consume individual content from content selection made available via media device 101. The user interface dashboard displayed on the display device 102 may be from the content servers 105, from content 106 or be locally generated by media client device 101.

The networked environment 100 may also include a broadband network such as cable television network or direct broadcast satellite network with cable or satellite STB as media client device 101 serving as gateway. A STB may be configured to stream media content from the network 104. This is often referred to as Over-The-Top (OTT) content delivery because the main mode of content delivery for STB is accomplished via cable or satellite. Other components such as "head-end" are well known structures in broadband network are not shown or not described in detail to avoid obscuring aspects of the present disclosure.

FIGS. 2A, 2B, 2C, and 2D illustrate screen shots of typical layouts for dashboards or menu screens displayed with the networked environment 100. These dashboards or menu screens may appear cluttered and complicated to navigate. The representations within the screen shots are shown for illustrative purposes only. For example, contents within the screen shots may be omitted or added without limiting the scope of present disclosure.

Figure 2A:
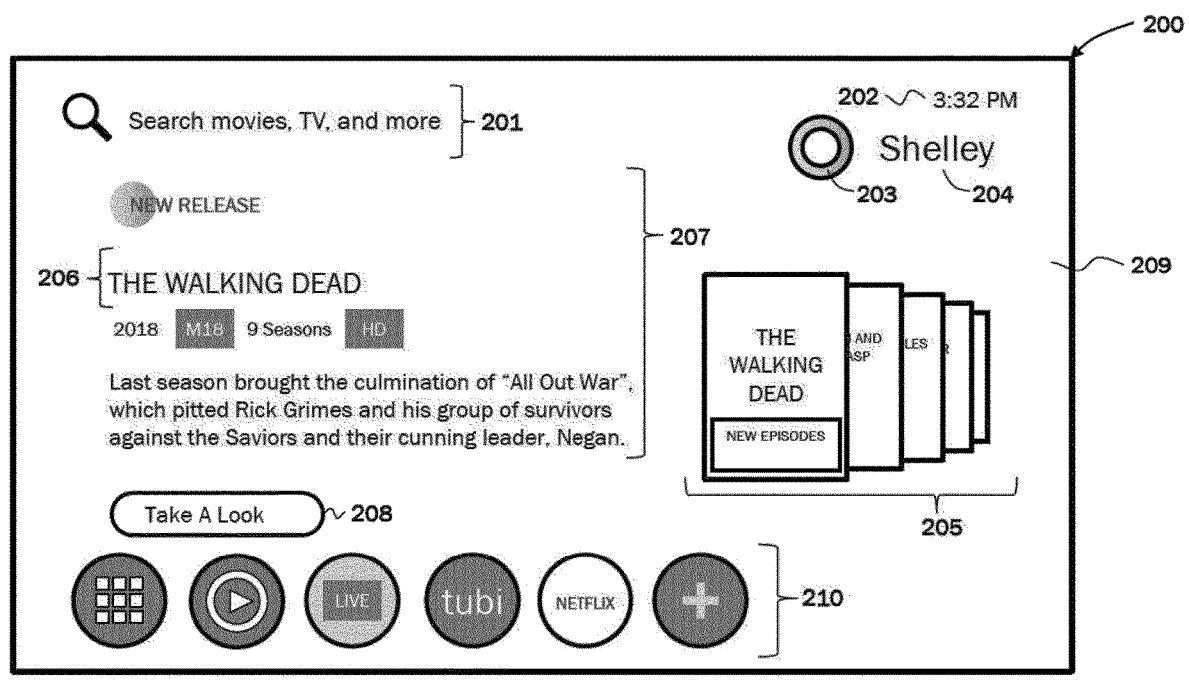
FIGS. 2A, 2B, 2C, and 2D, illustrate screen shots of typical menus displayed with the networked environment.

FIG. 2A is a diagram of an example user interface dashboard (i.e., menu interface). User interface dashboard 200 shows a screen shot of a home screen which is personalized by the user and associated with a user data 108. For example, user interface dashboard 200 may include menu items associated with a user "Shelley" as indicated by the user avatar name.

A user interface dashboard may include a content search interface 201, a current time 202, an arc menu launcher icon 203, a user avatar name 204, a scrollable list of recommended contents 205, a content information area 207 including a content title area 206, a content summary area, and a launchable action icon 208 corresponding to the content identified in the content information area 207, a background screen 209, and a list of feature entry points (e.g., various menu and application launcher icons) 210.

The content search interface 201 provides an interface for a user to input search parameters to search for content that the user would like to consume. For example, search parameters may include keywords, content titles, artist names, actor or cast member names, genre type etc. The contents may be searchable based on relevant metadata 107 associated with each content.

The scrollable list of recommended contents 205 may be populated from a database of contents 106 chosen by content provider such as Netflix® and HBO® or service provider such as Comcast® and AT&T®, based on many factors such as the subscriptions associated with user data 108, response to a keyword search inquiry, user profile and recommendation based on a user's browsing and selection habits.

The content title area 206 may provide the title of the content presently displayed at the top of the scrollable list of recommended contents 205, which may be the series name of the TV series, or a movie title. Content information area 207 provides additional description about the content identified in the content title area 206. The content information area 207 may be derived from aggregated metadata 107 received from one or more content servers 105 that correspond to the content identified in the content title area 206. The content may be an episode of a TV series, a movie, a song, etc., received from content server 105. The corresponding launchable action icon 208 may provide the user 110 the option to further act on the content, e.g., to play the content, a trailer related to the content, or browse all episodes relating to the series.

Figure 2B:
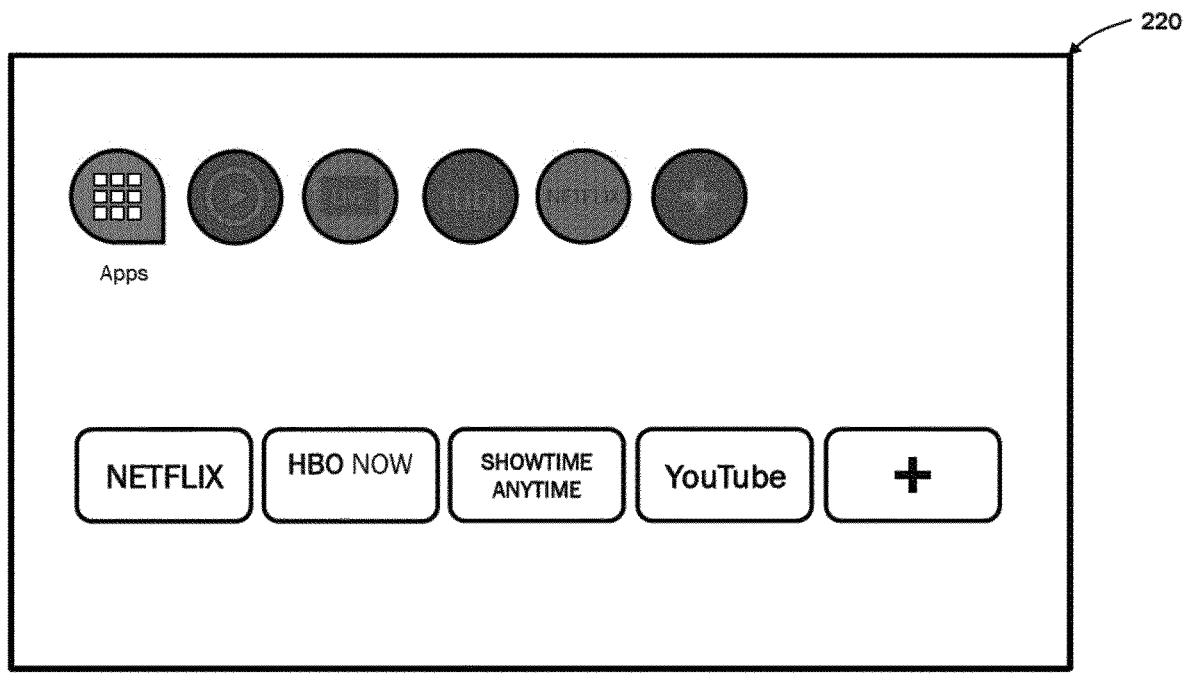
Figure 2C:
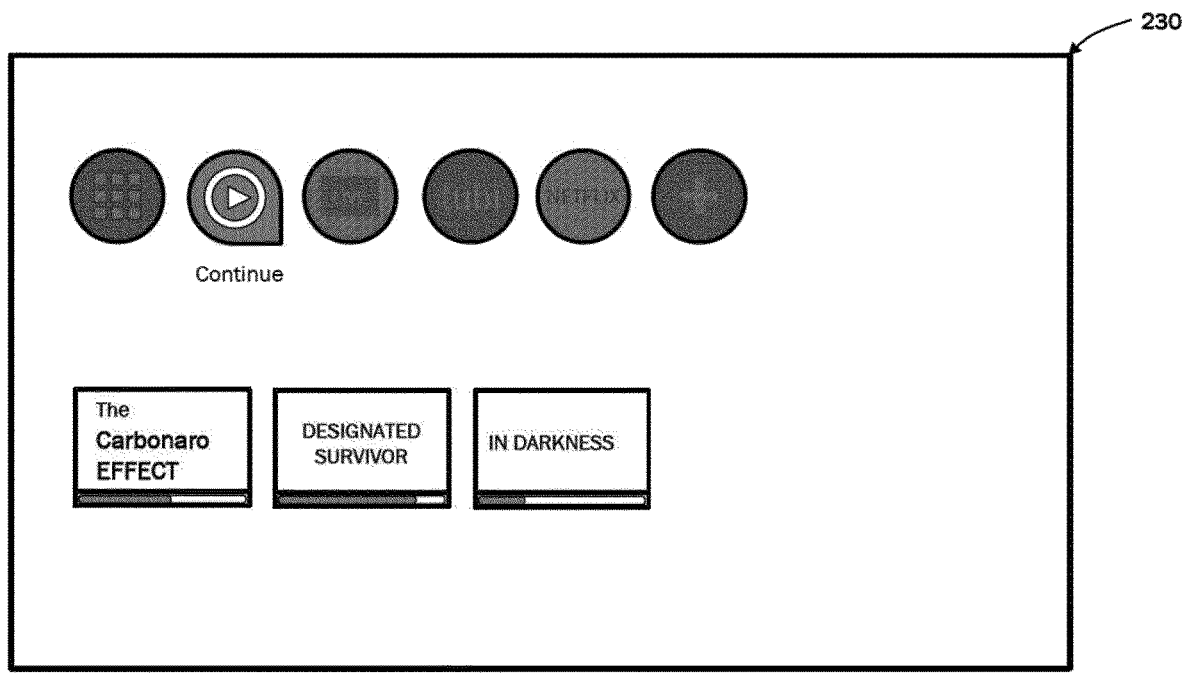
Figure 2D:
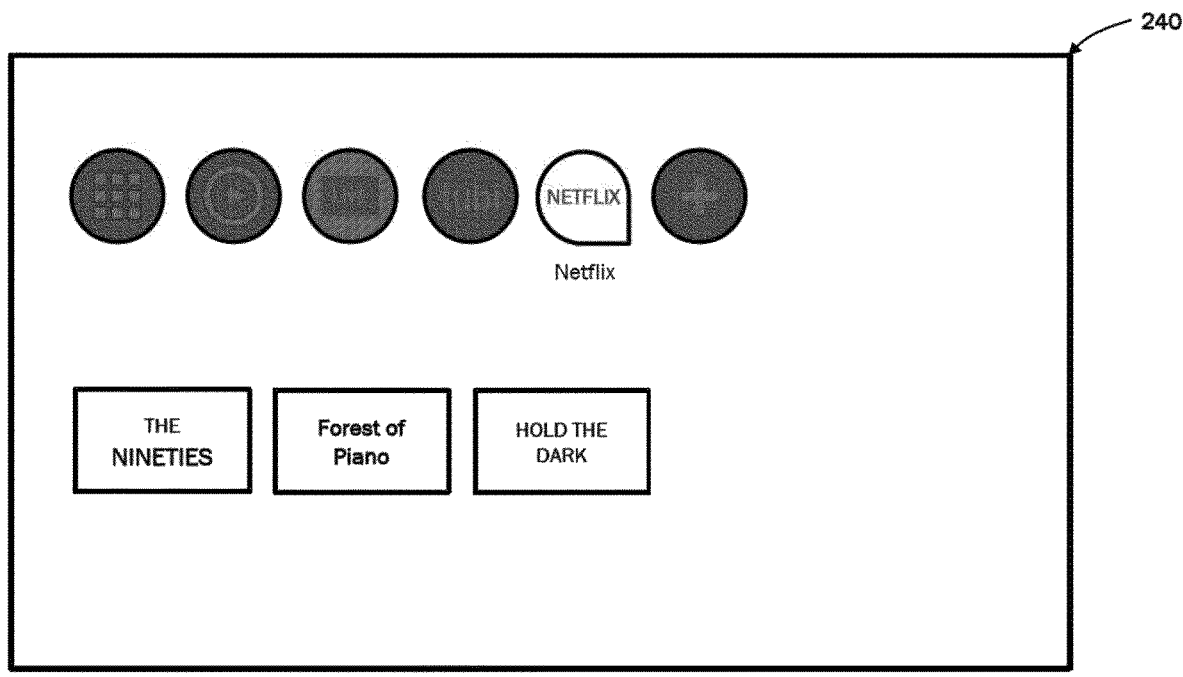

The feature entry points 210 may be further actions, menus, or application launcher icons arranged to provide a user direct access to further actions, different menus, and other applications. The feature entry points 210 may provide direct access to contents dedicated to a particular content provider or a list of content providers. FIGS. 2B, 2C, and 2D illustrate example screen shots of user interface dashboards 220, 230, and 240 respectively depicting a user interface for browsing, selecting and consuming contents transmitting from content servers 105 through feature entry points 210.

Referring to FIG. 2B, user interface dashboard 220 may be displayed when a user activates the "Apps" icon of the feature entry points 210. User interface dashboard 220 may include an arrangement of application launcher icons.

Referring to FIG. 2C, user interface dashboard 230 may be displayed when a user activates the "Continue" icon of the feature entry points 210. User interface dashboard 230 may include an arrangement of content icons corresponding to content which the user has not finished consuming. The content icons may include a progress indicator.

Referring to FIG. 2D, user interface dashboard 240 may be displayed when a user activates the "Netflix" icon of the feature entry points 210. User interface dashboard 240 may include an arrangement of content icons corresponding to recommended content available from a particular content provider.

The background screen 209 may show an image related to the content or a blank screen with default color scheme for example blue or black. A media client device 101 may allow a user to change background screen 209 in "Setting" option, to display customized color scheme, picture such as family photo, scenery photo, or task reminder, to be loaded into media client device 101.

Figure 3A:
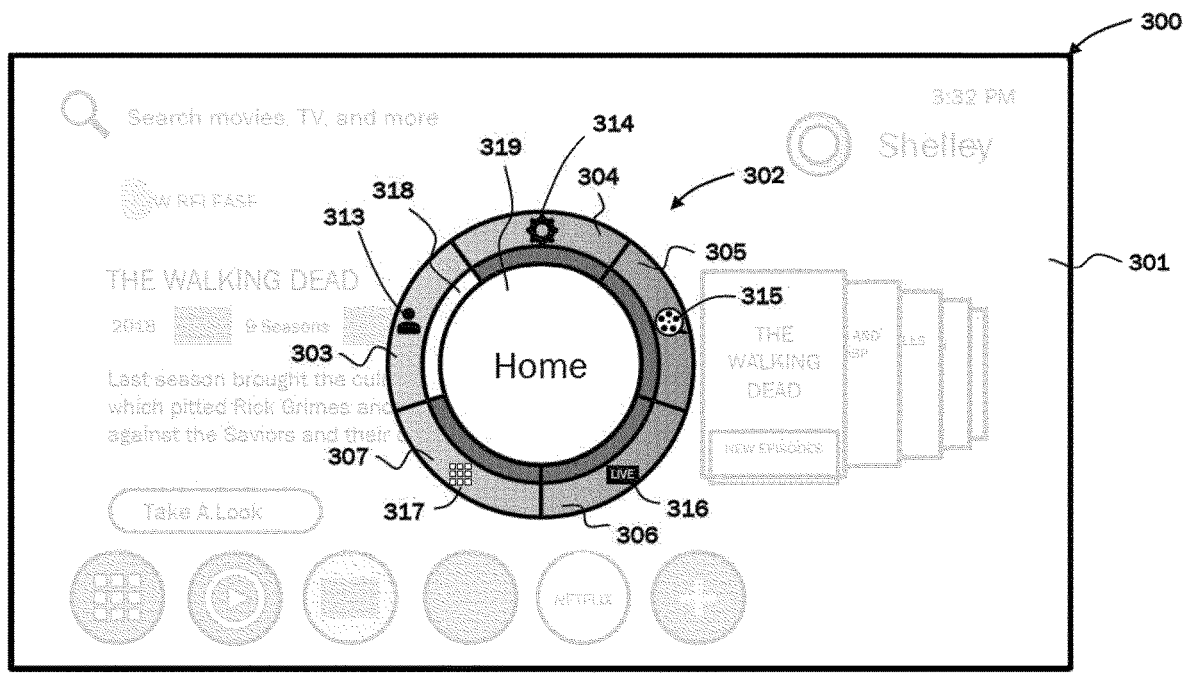
FIG. 3A illustrates an exemplary screen shot of an arc menu user interface according to an aspect of the present disclosure.

FIG. 3A illustrates a screen shot of an arc menu user interface according to an aspect of the present disclosure. Referring to FIG. 3A, aspects of the present disclosure as relating to system and method of providing a simple and intuitive radial menu UI that more clearly delineates the selection path taken by a user and that is more visually interesting than standard cascading menus and traditional radial menus are illustrated. In one embodiment, a user interface dashboard 300 shows a screen shot of arc menu UI 302 overlaid on top of a home screen 301 which is personalized by the user. The home screen 301 is "lowlighted" or blurred out as background to give contrast and emphasize the arc menu UI 302. The arc menu UI 302 may be generally ring-shaped, although other configurations are possible, such as polygonal. The arc menu UI 302 may include multiple selectable items arranged radially in an arc around one point on a display (e.g. a center of the radial menu). The selectable menu items may include text descriptions, icons, or other suitable indicators. The menu items may be displayed as sectors, wedges, slices, or the like. The menu items may be arranged with uniform spacing or with non-uniform spacing.

An arc menu UI 302 may be dynamically and automatically generated based on a linear menu. For example, the arc menu UI of FIG. 3A may be generated based on the dashboard 200 of FIG. 2A when a user activates the arc menu launcher icon 203 of dashboard 200. The selectable menu items 303, 304, 305, 306, and 307 may allow direct access to different screen pages, functions, and activities quickly and easily. Menu items of greater importance, greater relevance, or of higher frequency of use based on a historical usage analysis (e.g., heuristics) may be chosen from dashboard 200 to be placed on the arc menu UI 302. In one example, selectable menu items 303, 304, 305, 306, and 307 may include direct access to "Home page", "Settings", "VOD", "Live TV", and "Apps". The chosen menu items are not limited to the menu items of the menu screen from which the arc menu UI is derived or invoked. That is, the chosen menu items displayed on the arc menu UI may include menu items that are not included or displayed in a user interface dashboard or menu screen from which the arc menu UI is invoked. The chosen menu items for the arc menu UI may be menu items that are more commonly used by most users or may be more regularly used by the user. The chosen menu items may be related to each other. The chosen menu items may be related to an activity of the user. A user does not need to memorize the sequence of selections to various functions or to navigate deep into hierarchically related menu levels. A media client device may track, store, analyze, and use user actions and selections to generate an arc menu UI.

In one example, selectable menu items 303, 304, 305, 306, and 307 may be arranged as five (5) uniformly spaced wedge slices or sectors. To maintain an uncluttered, easy to use arc menu UI, eight (8) or fewer selectable menu items should be used when arranging the arc menu UI as slices or sectors. The arc menu UI 302 may include sectors and selectable menu items that are contextual to the screen page, function and activity that a user is browsing or using. For example, the menu items may be selected based on the current screen page, a current function, and/or activity, such as browsing through new releases of a content provider. For example, the size and position of a sector may change depending on an importance, relevance, and/or frequency of use. The number of sectors and size of each sector may change automatically and dynamically, without any user intervention to configure or adapt a menu interface to different screen page, functions and activities.

In one example, the selectable menu items 303, 304, 305, 306, and 307 may be associated with a respective icon 313, 314, 315, 316, and 317 instead of a text descriptor to reduce clutter and facilitate easier navigation.

In one example, an indication of a presently selected selectable menu item may be provided. For example, a menu item highlighter 318 may be nested on the inner side of the arc menu for each selectable menu item on the arc menu. The menu item highlighter 318 when highlighted may indicate the menu item is presently selectable. The menu item highlighter 318 may animate to rotate clockwise or counterclockwise about center of the arc menu in response to detecting user's position or gesture on the remote controller to rotate arc menu. Alternatively, the selectable menu item and menu item highlighter may both be highlighted. Alternatively, the arc menu may include highlighting of the selectable menu item rather than a menu item highlighter 318 nested on the inner side of the arc menu. The menu item name 319 in the center of arc menu may be highlighted to indicate a selectable menu item.

While the example screen shot of FIG. 3A illustrates the arc menu UI is displayed to overlay in front of a home screen, one of ordinary skill will recognize that in some circumstances the arc menu UI may be displayed over different background screens and other UI items when the arc menu is invoked. The arc menu UI may be located in the center of screen or at any location on the screen. FIGS. 3B, 3D, 3F, and 3H illustrate exemplary screen shots of user interface dashboards 320, 330, 340, and 350 respectively when a user navigates through the different menu items with an arc menu UI. FIGS. 3C, 3E, 3G, and 3I illustrate exemplary screen shots 321, 331, 341 and 351 of the respective menu screens low-lighted in corresponding user interface dashboards 320, 330, 340, and 350.

The arc menu UI is simpler than the underlying screen page which allows a user to quickly jump to a desired screen page, function or activity by selecting from a subset of menu items, where the subset may be dynamically generated for example based on the menu items of the screen page from which the arc menu UI was invoked and any additional relevant menu items. Menu items of the subset may be selected based on a greater importance, a greater relevance, a higher frequency of use, and/or a relationship to selected menu item. The subset of menu items is arranged to be easily navigated for example by contacting a corresponding area of a touch sensor of a remote controller or gesturing to rotate clockwise or counterclockwise.

In addition to menu item highlighter 318 and menu item name 319 indicating the selected screen page, the screen page in the background may also automatically change to correspond with the menu item selection. For example, when the highlighted selection rotates clockwise from "Home page" as in FIG. 3A to "Setting" in FIG. 3B, a user also sees a screen page 301 showing a "Home" menu page changing to a screen page 321 showing "Setting" menu page, even if the background screen page is lowlighted or blurred. If a user confirms selection of this menu item, the screen page changes from screen page 301 to screen page 321 and the arc menu UI is exited. If the user selects another area of the touch sensor of the remote controller or continues to rotate clockwise to a next menu item, the user interface dashboard changes to 330 as in FIG. 3D providing visual cue of "VOD" screen page 331. If the user confirms selection of the menu item, the screen page changes to a "VOD" screen page as in FIG. 3E, providing recommended contents and new releases based on several factors including for example a user's subscriptions, the user's profile and/or the user's browsing and selection habits. Likewise, the user may continue to select a corresponding area or gesture to rotate clockwise to another menu item "Live TV" and "Apps" with user interface dashboard 340 and 350 providing visual cues of the corresponding screen pages 341 and 351.

Figure 3B:
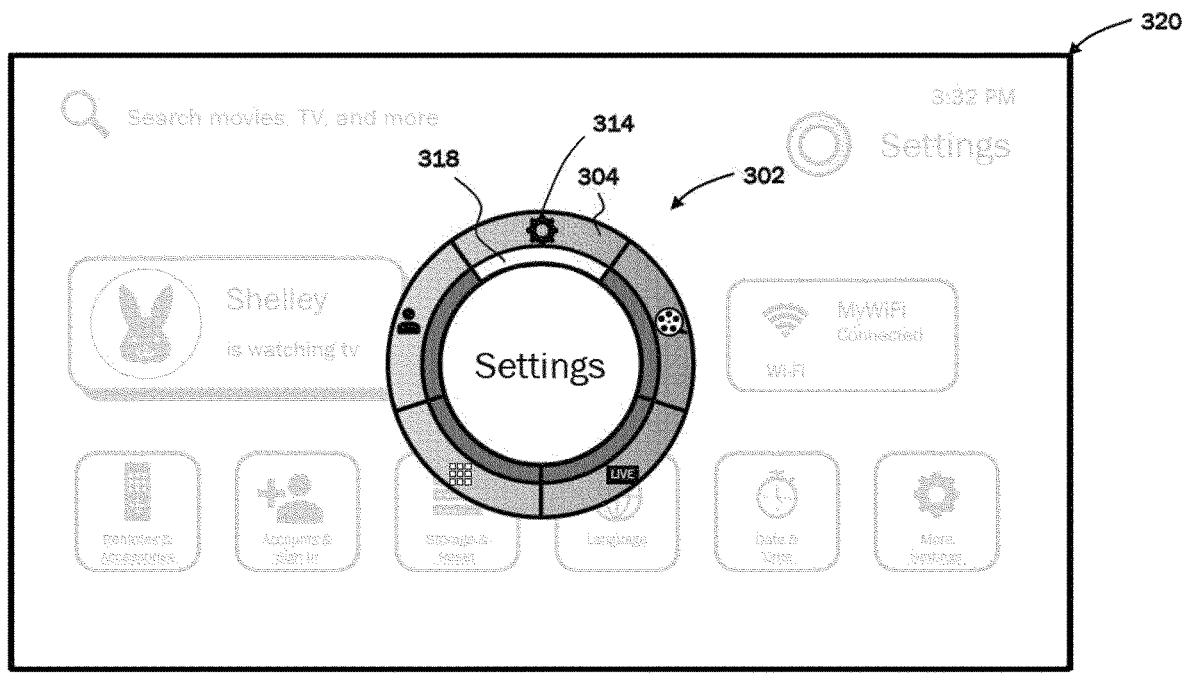
FIGS. 3B, 3D, 3F, and 3H illustrate exemplary screen shots of user interface dashboards when a user navigates through the different menu items with an arc menu UI.
Figure 3C:
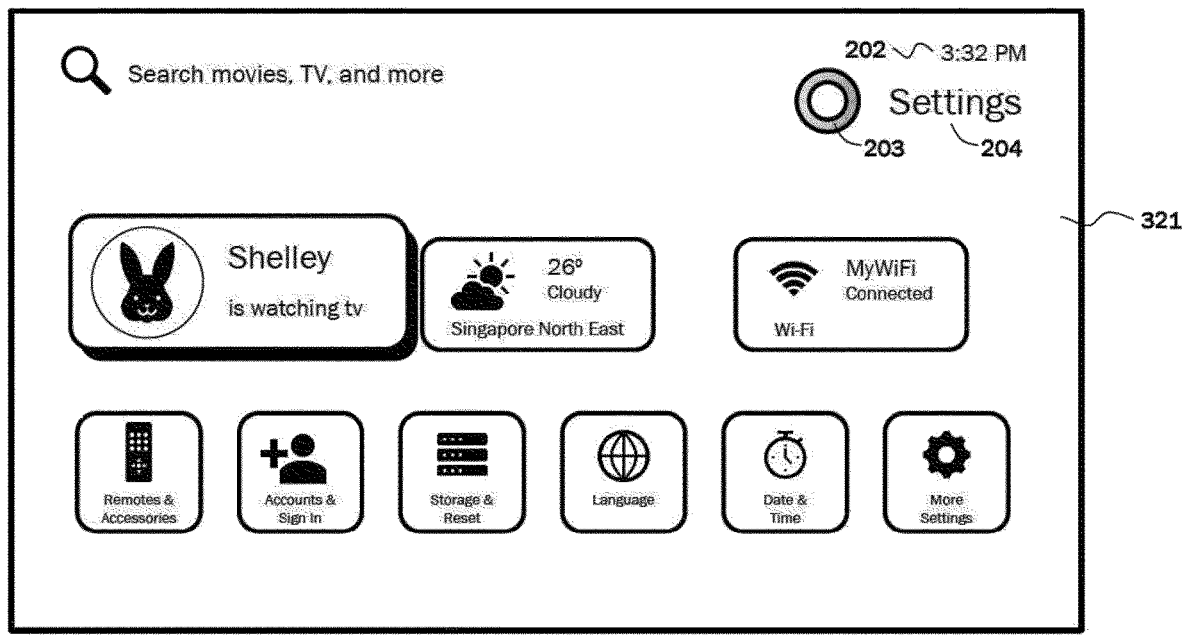
FIGS. 3C, 3E, 3G, and 3I illustrate exemplary screen shots of the respective menu screens low-lighted in corresponding user interface dashboards illustrated in FIGS. 3B, 3D, 3F, and 3H.
Figure 3D:
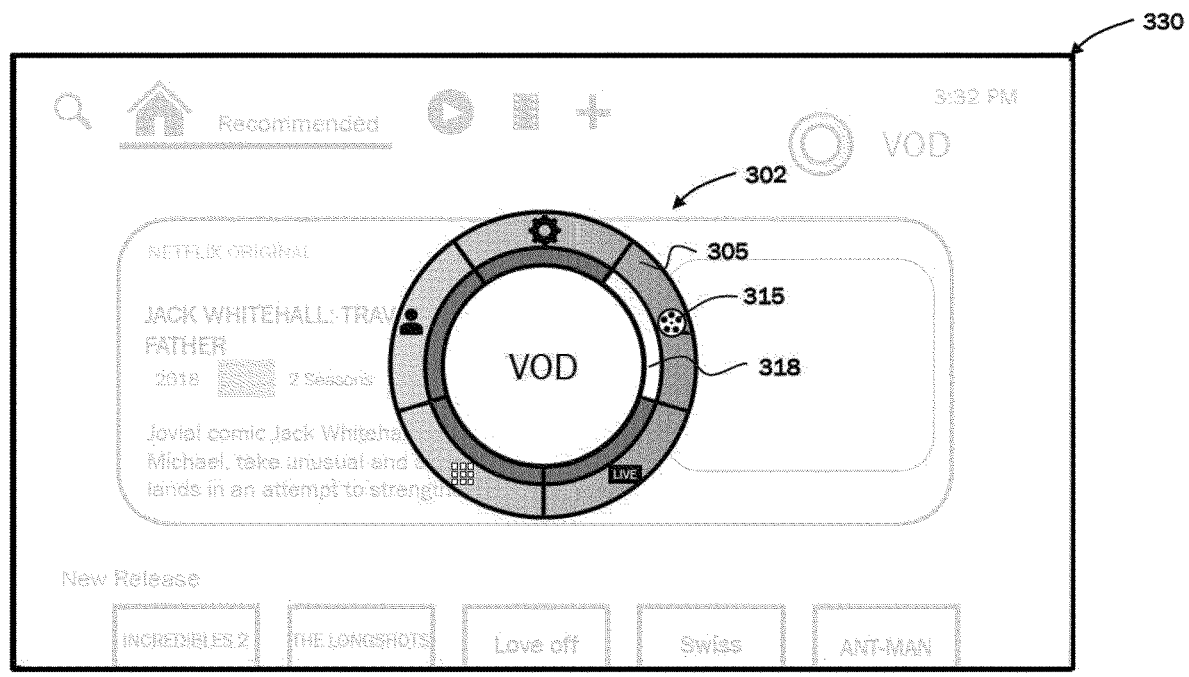
Figure 3E:
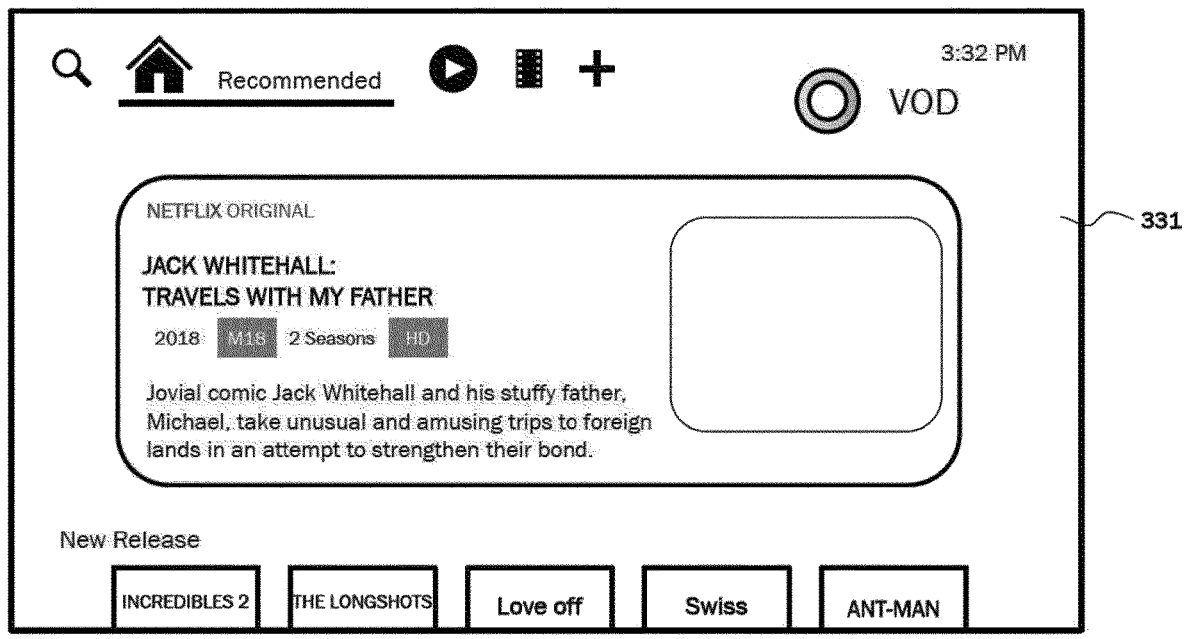
Figure 3F:
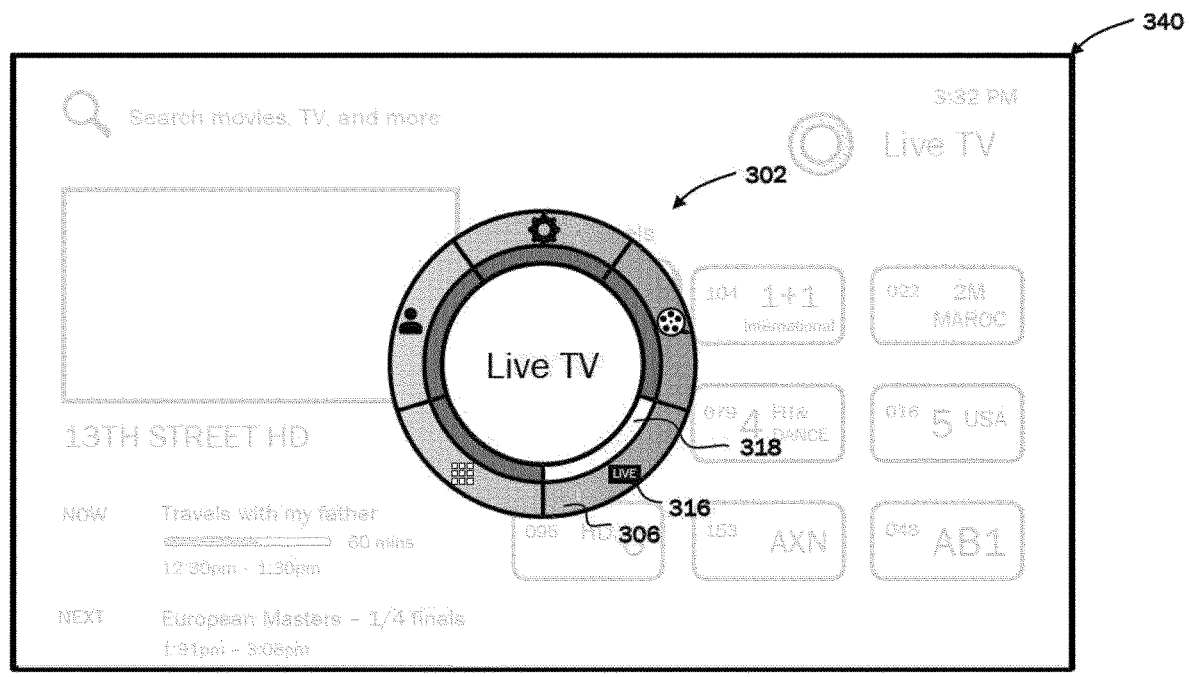
Figure 3G:
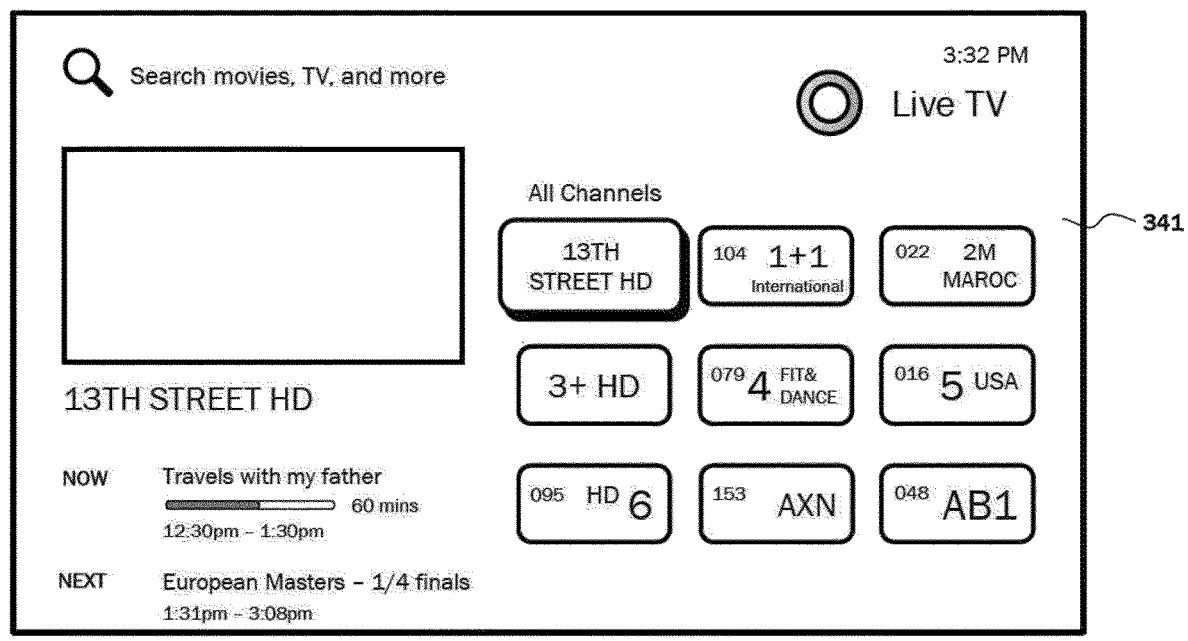
Figure 3H:
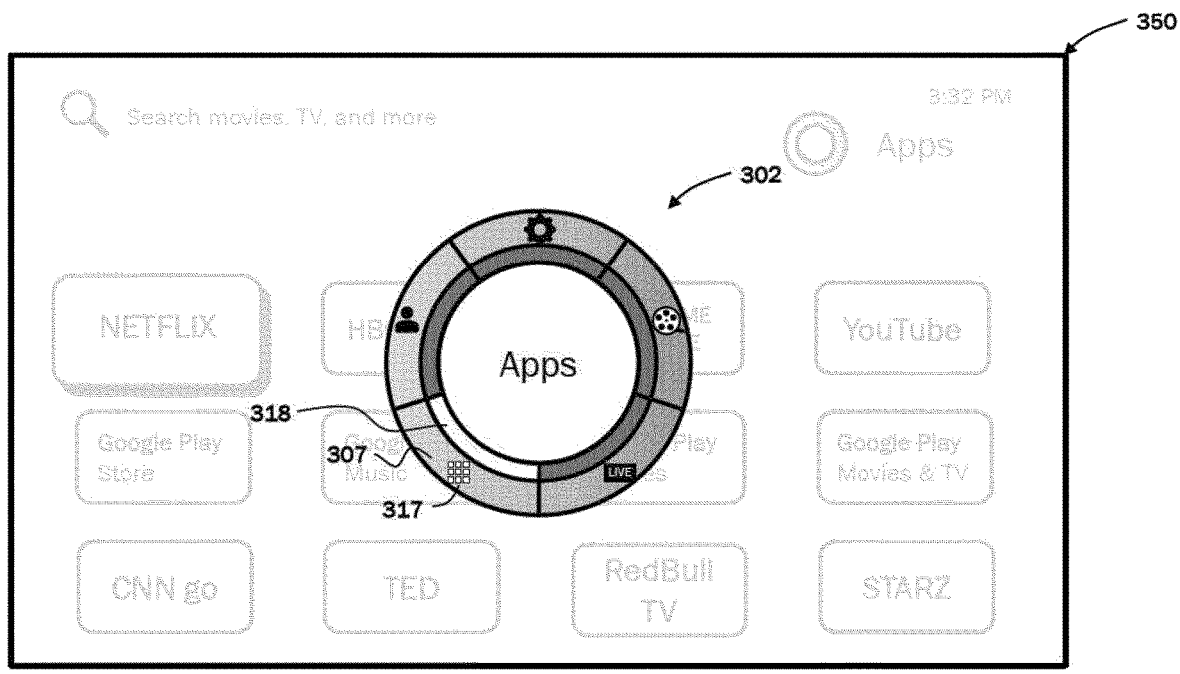
Figure 3I:
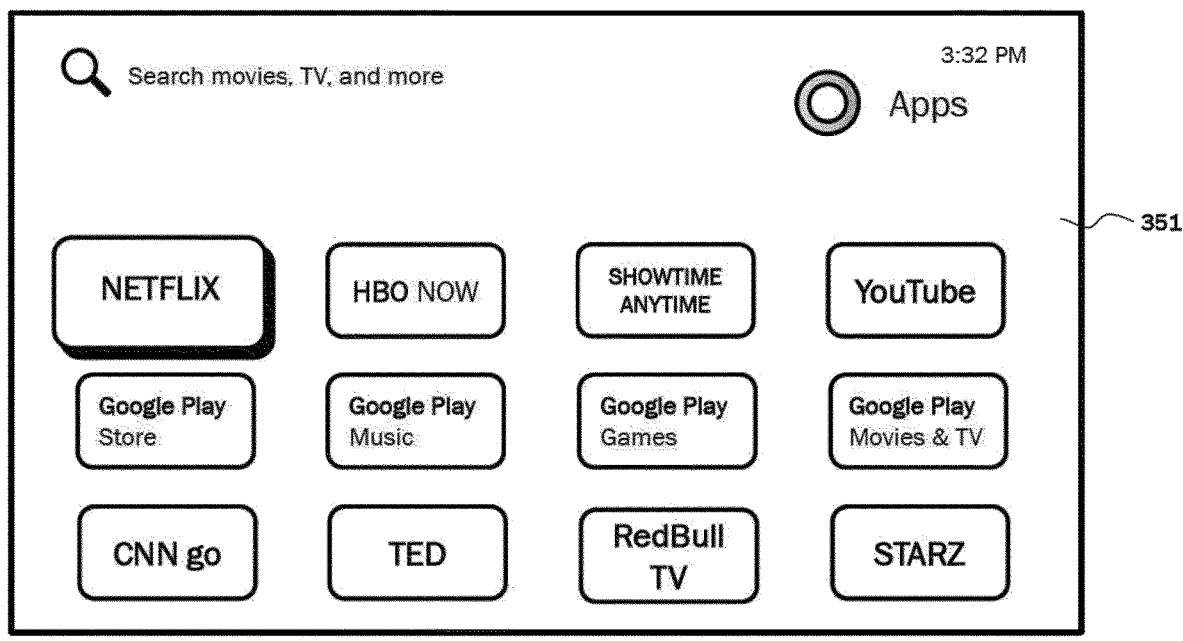
Figure 3J:
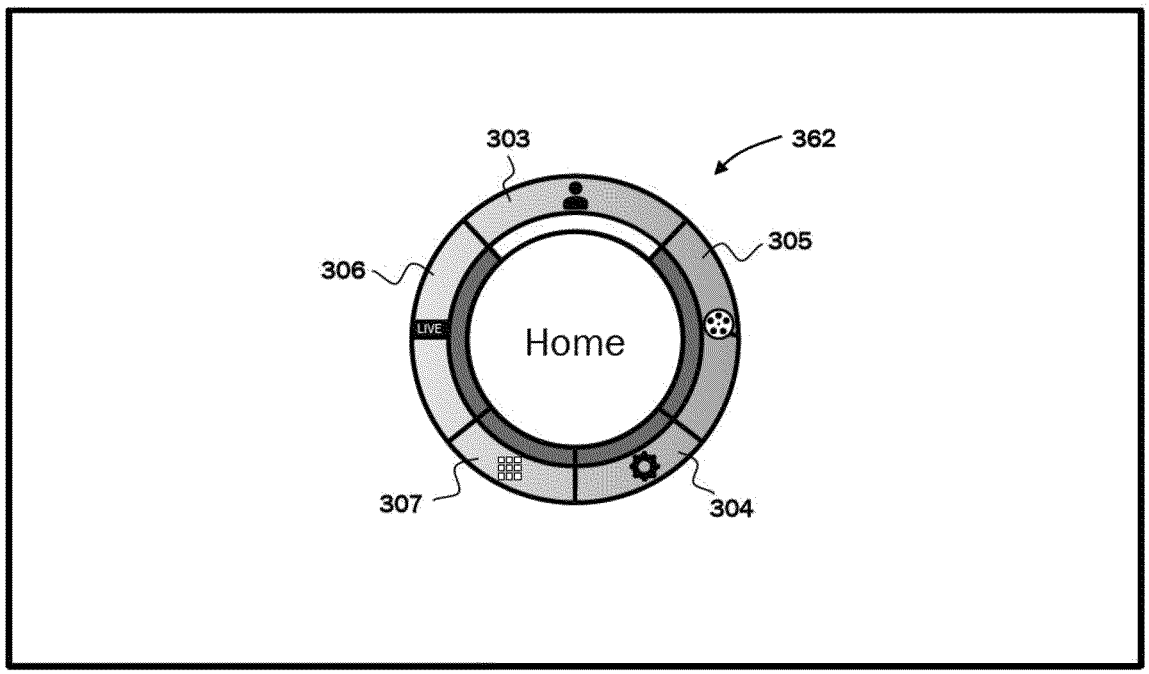
FIG. 3J illustrates an exemplary screen shot of an arc menu UI with menu items arranged in sectors having a non-uniform spacing.

FIG. 3J illustrates an exemplary arc menu 362 with menu items arranged in a non-uniform spacing. Menu items of greater importance, greater relevance, or greater frequency of use may be automatically assigned larger areas (e.g., larger sectors in a radial menu) and/or convenient locations (e.g., a position that is more accessible to a user's finger or more prominent to a user's vision such as, a top portion of a circle in a radial menu) on the arc menu user interface. Unlike traditional interfaces, these are not constrained to cardinal locations. For example, selectable menu items 303, 305, and 306 providing direct access to "Home page", "VOD" and "Live TV" are more frequently used and are assigned with larger areas and convenient locations, in contrast to less frequently used menu items "Settings" 304 and "Apps" 307. The importance of a menu item may be predetermined by the arc menu UI. The frequency of use of particular menu items may be tracked by the arc menu UI. Alternatively, the arc menu UI may be customizable.

The arc menu UI may include a set of on-screen user interface components which may be used in various combinations and arrangements to provide an easy-to-use consumer interface. Each individual component has very specific behavior characteristics with certain, finite configurable parameters that determine the exact look and feel of the user interface. One component may interact with or be used in combination with another component.

An aspect of the present disclosure includes an arc menu user interface (UI) associated with media client devices configured to display primary menu items in response to a first user interaction to allow a user to navigate, search and consume media contents via remote controller in an efficient and intuitive manner. The arc menu may be dynamically customizable with up to eight (8) sectors, defined on the fly. The arc menu includes selectable menu items and sectors that are contextual to the screen page, function and activity that user is browsing or using. The number of sectors and sector size may change dynamically and customizable adapting to different screen page, functions and activities. Returning to FIG. 1, the media client device 101 may send an information signal wirelessly (for example the number of sectors and sector size) to user device 103 for the user device to work seamlessly with the arc menu displayed on user interface dashboard 109 (which will be described in detail later). Menu items of greater importance, or highest frequency of use can be assigned larger areas and/or convenient locations on the arc menu user interface. Unlike traditional interfaces, these are not constrained to cardinal locations. User does not need to memorize the sequence of selections to various functions or to navigate deep into hierarchically related menu levels.

Figure 4A:
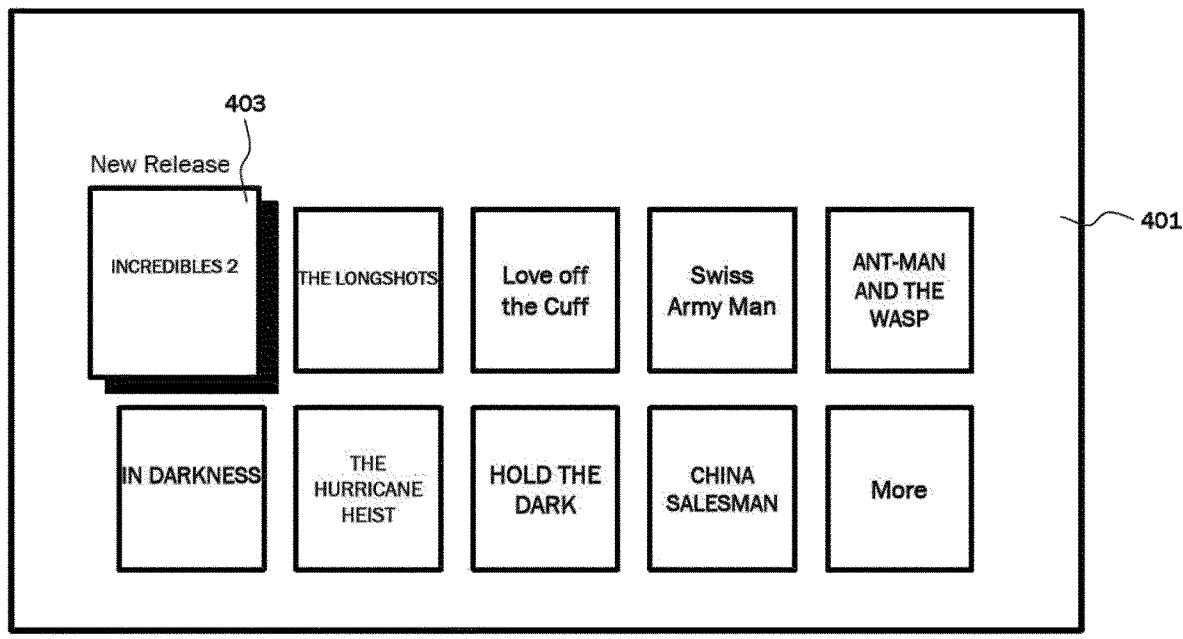
FIGS. 4A, 4B, and 4C illustrate exemplary screen shots of user interface dashboards before and after a user invokes an arc menu UI.
Figure 4B:
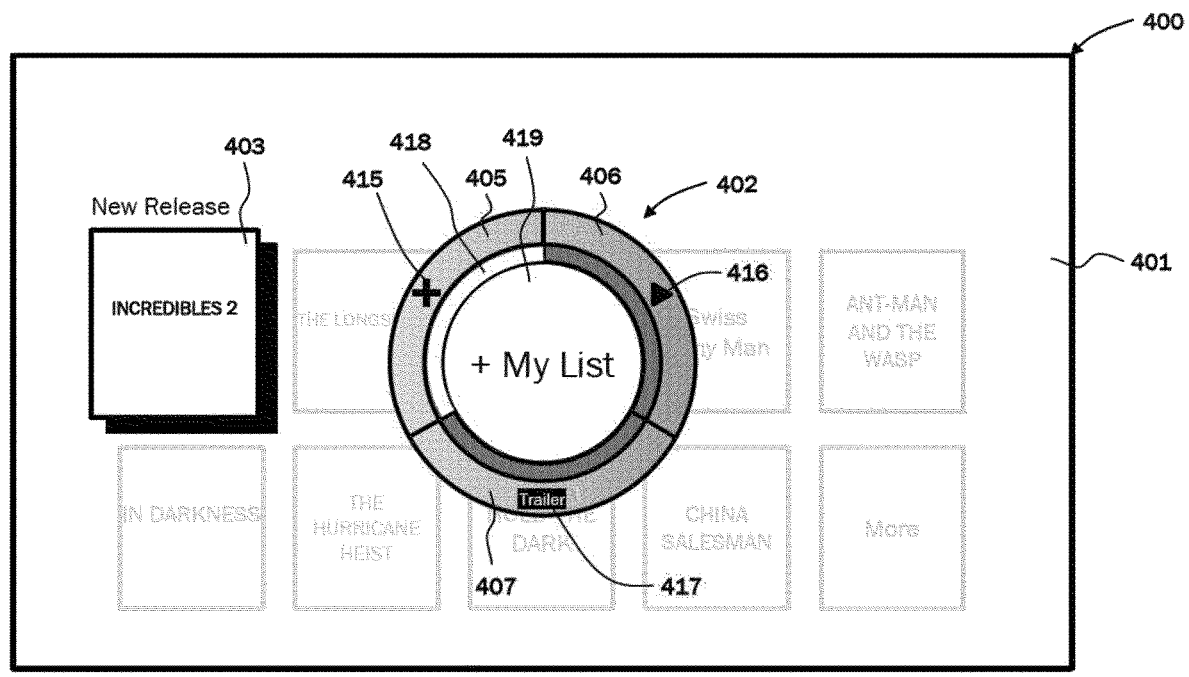
Figure 4C:
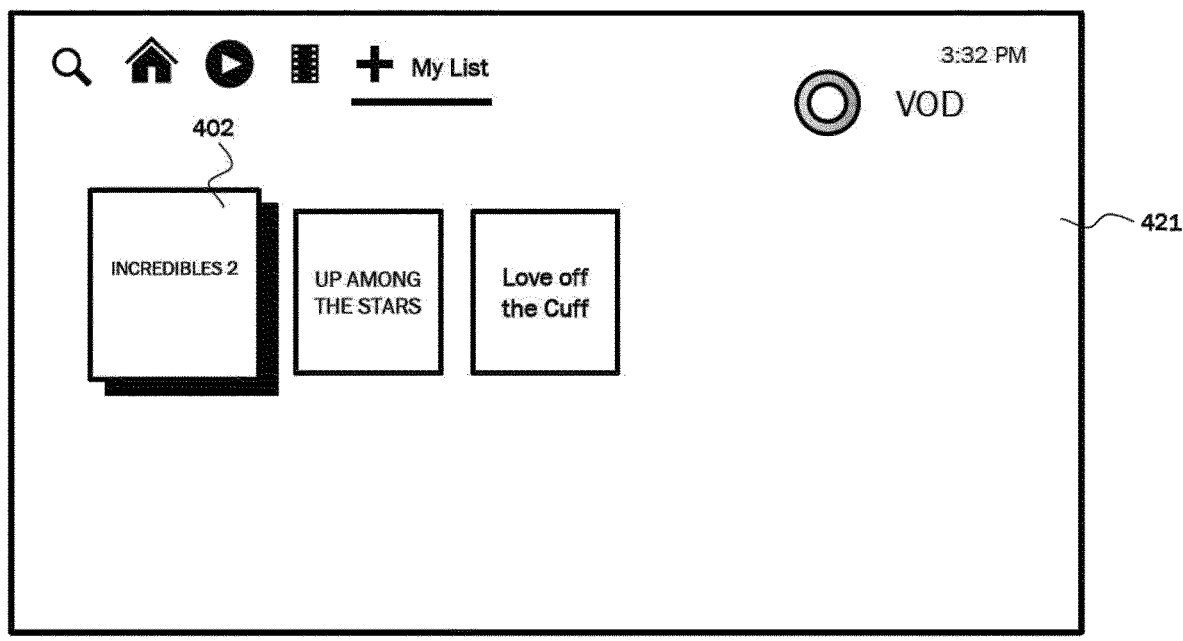

FIGS. 4A, 4B, and 4C illustrate exemplary screen shots of a user interface dashboards when a user invokes an arc menu UI to add a movie to the user's favorite list. Referring to FIG. 4A, a user is browsing "New Release" on the VOD screen page 401 and the user would like to select a particular movie to add to the user's favorite list. In one example, when the movie thumbnail display 403 is highlighted (e.g., the thumbnail titled "Incredibles 2"), a user may invoke arc menu 402 on a user device, for example a remote controller, with a button press, touch, or gesture. Referring to FIG. 4B, the user interface dashboard 400 includes an arc menu UI 402 overlaying screen page 401. The arc menu UI 402 may include a plurality of selectable menu items that are relevant and contextual to the handling of the media content displayed on screen page 401. For example, the arc menu UI may be dynamically customized to include three (3) selectable menu items 405, 406, and 407 that are presented by icons 415, 416, and 417 to provide direct access to "+My List", "Play movie", and "Play trailer" activity options to consume the media, for example, to add the movie to user's favorite list, to play the movie, or play the movie trailer. When a user navigates to menu item 405, the menu item highlighter 418 animates to rotate to menu item 405 corresponding to the user's action. Menu item name 419 describes the highlighted menu item showing "+My List". When the user selects the menu item 405, the screen page may change or transition to the user's favorite VOD screen page 421 with movie thumbnail display 403 added among the user's other favorites and arc menu UI is exited, as shown in FIG. 4C.

Figure 5A:
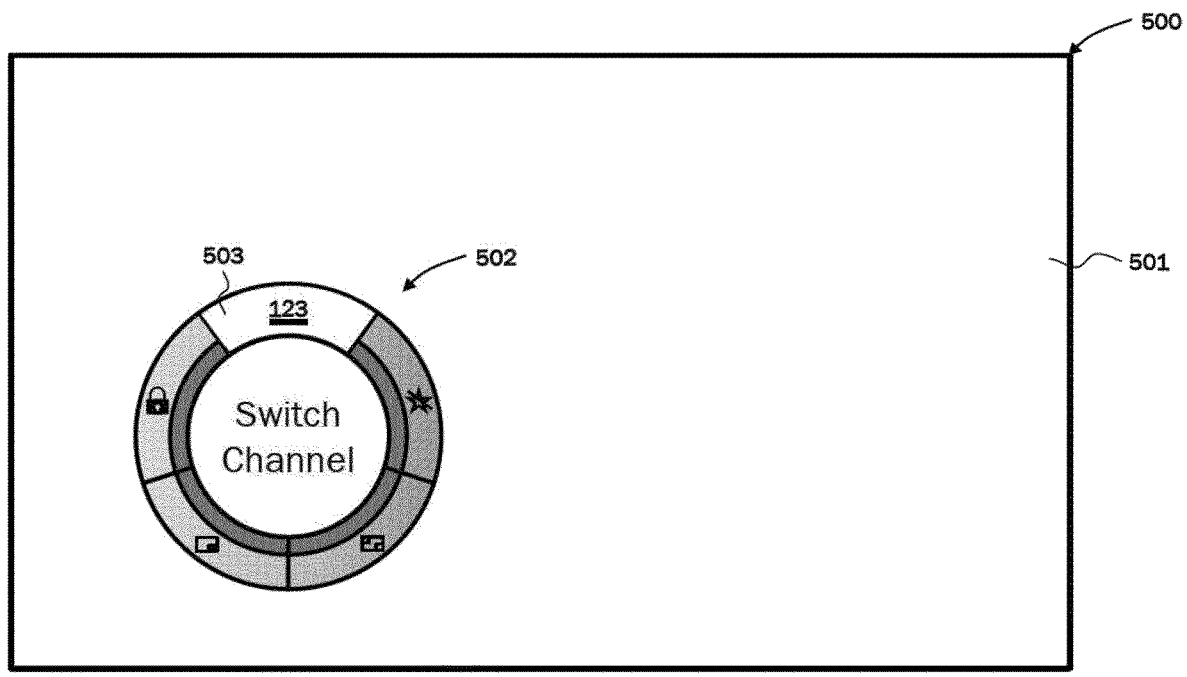
FIGS. 5A, 5B, and 5C illustrate exemplary screen shots of user interface dashboards when a user invokes arc menu UI to switch television channels.
Figure 5B:
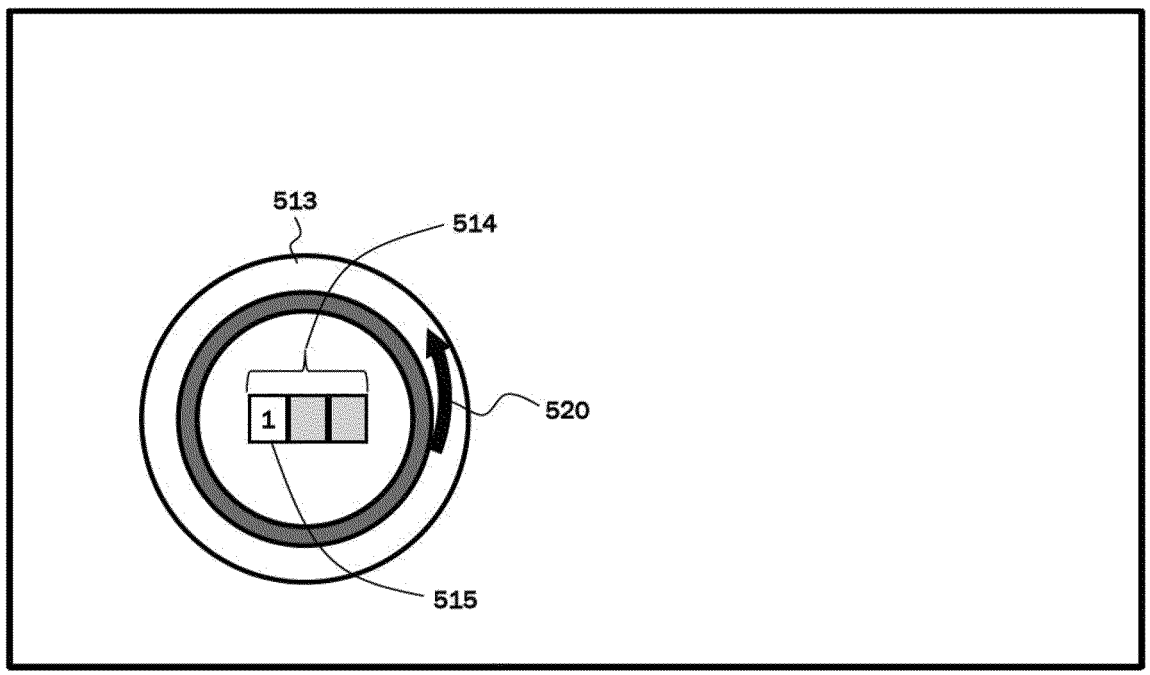
Figure 5C:
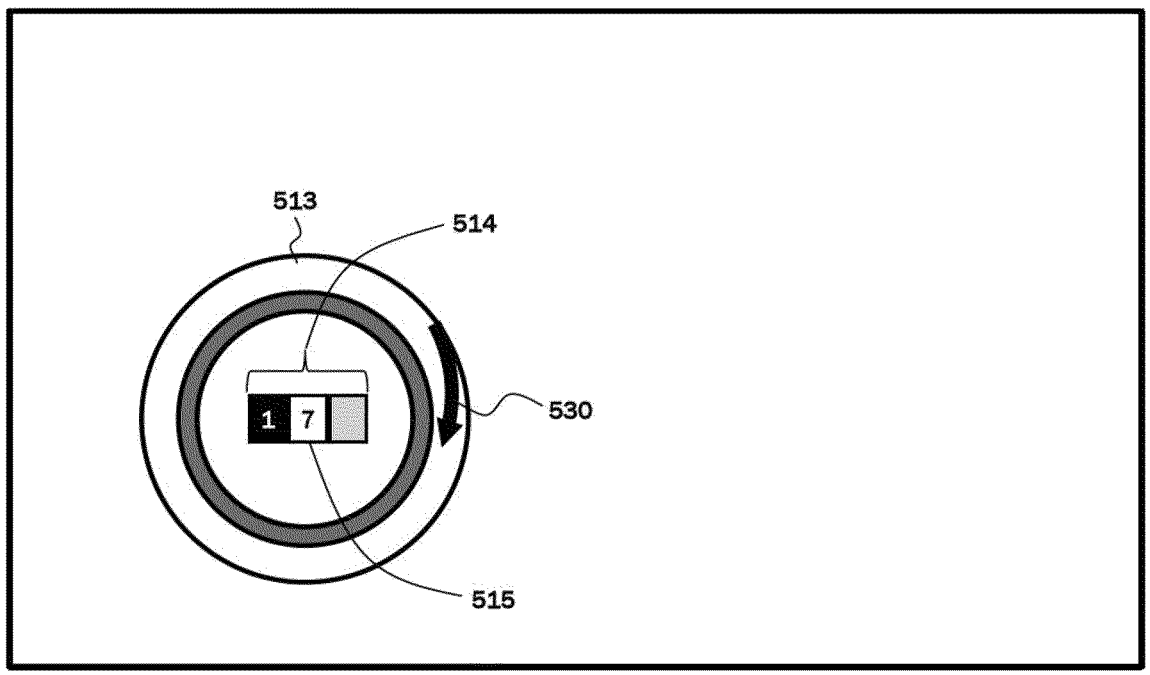

FIGS. 5A, 5B, and 5C illustrate exemplary screen shots of user interface dashboard 500 when a user invokes arc menu UI 502 to switch a channel in Live TV screen page 501 instead of fumbling with remote controller with more than 20 buttons. Referring to FIG. 5A, the arc menu UI 502 may automatically configure itself to show relevant selectable menu items related to a channel switching activity or function. The relevance of a selectable menu item may depend on an immediately prior action of the user, one or more prior actions of the user, or a user profile. This allows a user to navigate and consume media contents via user device such as remote controller in an efficient and intuitive manner. Selectable menu item 503 may include an option to switch a channel, that is highlighted and when selected, will animate to display character dialing as shown in FIG. 5B. An arc menu UI may change dynamically to allow a user to "dial" the channel in Live TV. A character entry 514 and an arc dialer 513 circumferentially disposed of around the character input as shown in FIG. 5B. The number of character entry is customizable and contextual to the screen page, as in this embodiment, character entry for three (3) are shown. A character entry highlighter 515 may appear on character entry 514 at the first position from left. The character entry may display alphanumeric characters, and all other symbols that can be input by user device 103 (FIG. 1) such as remote controller.

For example, an initial digit "5" may appear inside character entry highlighter 515 on the first position of character entry 514 from the left. Alternatively, a digit "0" or a blank space may appear inside character entry highlighter 515. Arc menu UI may animate to change initial character (for example "5") in character entry highlighter in an incremental manner (for example " "6, 7, 8") or a decremental manner (for example "4, 3, 2"), corresponding to user's gesture to dial clockwise or counterclockwise on user device 103 (FIG. 1).). For example, a user may intend to dial to channel "173" on Live TV. The user may rotate counterclockwise, as shown by counterclockwise arrow 520, to decrement by four from initial "5" to "1". A user may rotate clockwise to increment by six from initial "5" to "1", after passing "9" and "0" in a round-robin manner. A user may select their choice of character (for example "1") by pressing on selection key, or by moving the character entry highlighter 515 to next character to the right by pressing on navigation key or by waiting for predetermined time (for example, 1 second) to elapse. In an aspect of present disclosure, a method is provided wherein a user may dial the character by swiping clockwise or counter-clockwise on touch-sensitive navigation key on remote controller and "click anywhere" by clicking on the navigation key where the finger's position is at after inputting the character choice (which will be described in detail later). After inputting the first character, the character entry highlighter 515 may move to the second character input position, and initial digit "5" may appear inside character entry. A user may gesture to rotate clockwise, as shown by clockwise arrow 530, to increment by two from initial "5" to "7" as shown in FIG. 5C. Likewise, a user may continue to gesture to input the third character by rotating counterclockwise to input "3" to dial to channel "173". Subsequently or simultaneously, Live TV screen page 501 animates to display channel "173" and the arc menu UI exited.

Figure 6:
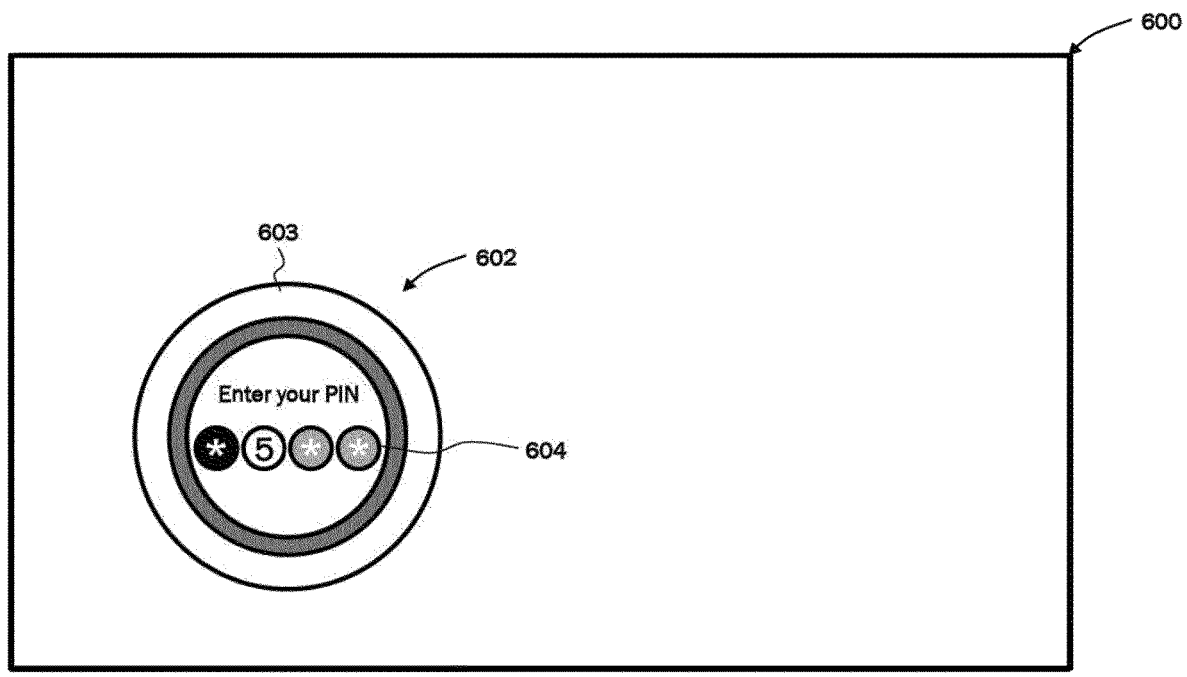
FIG. 6 illustrates an exemplary screen shot of a user interface dashboard when a user invokes an arc menu UI for inputting discrete user information.

FIG. 6 illustrates an exemplary screen shot of a user interface dashboard when a user invokes an arc menu UI for inputting discrete user information. The arc menu UI may change dynamically to allow a user to "dial" the user's secret code, password or PIN to unlock a channel. As described, arc menu 602 may contextually change to display character entry 604 for four (4) characters secret code, password or PIN. The character 'dialed" and selected into character entry is preferably displayed only while the user "dials" the arc dialer 603 and is changed to a hidden character symbol (for example "*") to prevent the user's secret code or password from being exposed.

Figure 7A:
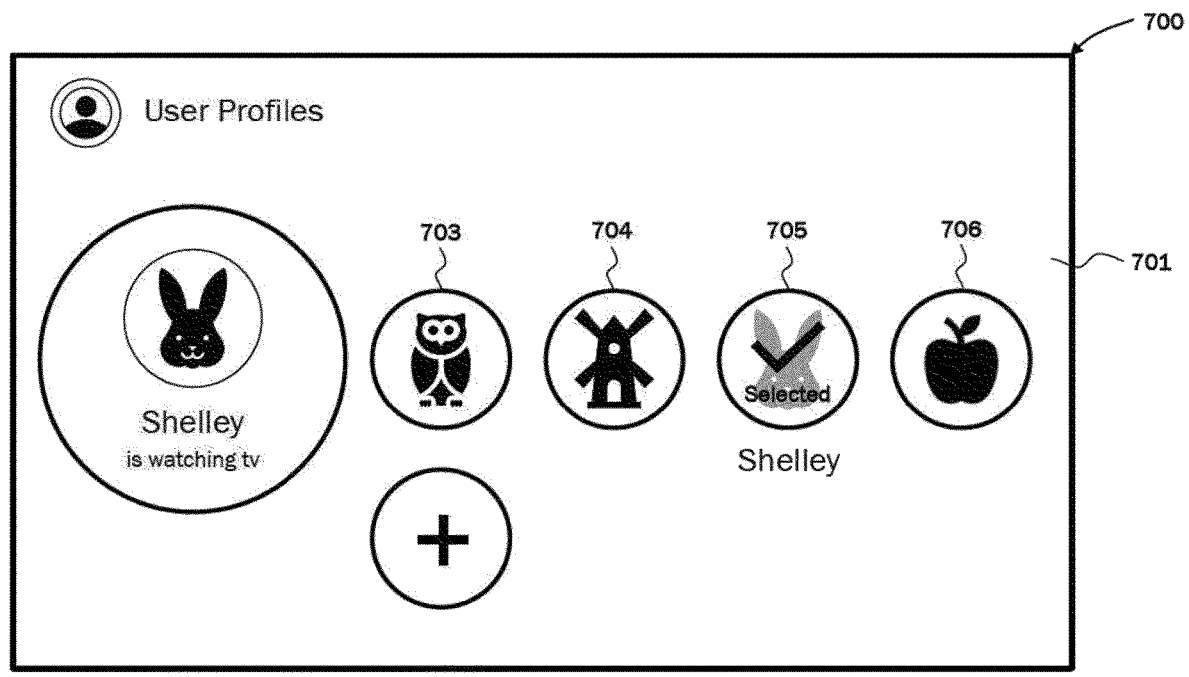
FIGS. 7A and 7B illustrates exemplary screen shots of user interface dashboards when a user invokes an arc menu UI for configuring user profiles.
Figure 7B:
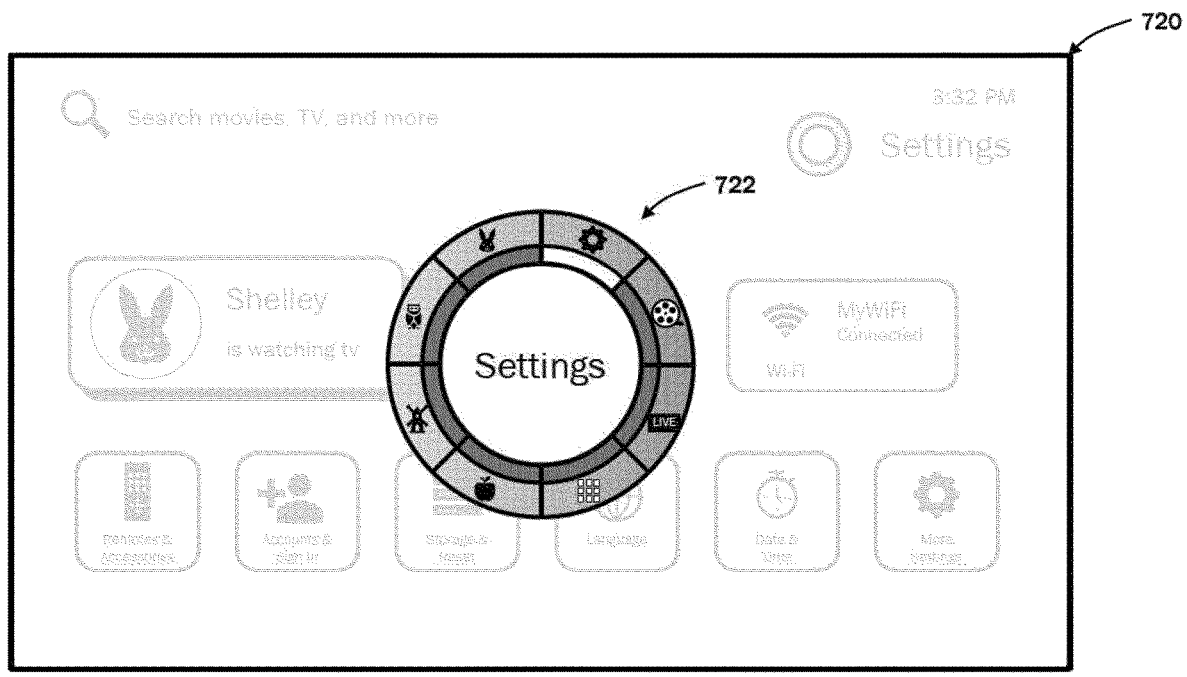

Referring to FIG. 3B, the personalization and user avatar name for a plurality of users may be added or omitted in "Setting" option accessible via arc menu. FIGS. 7A and 7B illustrates exemplary screen shots of a user interface dashboard when a user invokes an arc menu UI for configuring user profiles. FIG. 7A illustrates exemplary screen shots of user interface dashboard 700 for user to add plurality of user profiles represented by user icons 703, 704, 705, and 706, in "Setting" screen page 701. In one embodiment, three (3) different user profiles are added to initial user "Shelley" whom is represented by user icon 705 and automatically added in selectable menu items when arc menu 722 is invoked as shown in FIG. 7B to facilitate the quickest recognition and user profile selection thereof. In one embodiment, arc menu UI may automatically arrange selectable menu items and menu item highlighter in eight (8) equally spaced sectors. More profiles and hence more sectors are possible, but the arc menu UI may be cluttered whereas sectors may be too small for easy user selection.

A user device 103 is used in tandem with the arc menu UI. Interaction with the arc menu UI is facilitated through a user device 103. A user device 103 may include a handheld device such as a remote controller with a wireless interface such as Bluetooth (BT), Radio Frequency (RF), and Infrared (IR). A conventional remote controller may include a plurality of "shortcut" or specialized buttons to allow a user to directly access different screen pages, functions, and activities quickly. However, the number of "shortcut" or specialized buttons may become unmanageable with more functions and activities and thus overwhelm the user. Additionally, media content is often consumed in a darkened room where it would be difficult to see the buttons on the remote controller. A user may navigate a menu, search for content, interact with an application, and/or select their choice via views of the arc menu UI presented on a display device by moving their finger on the remote controller.

Figure 8A:
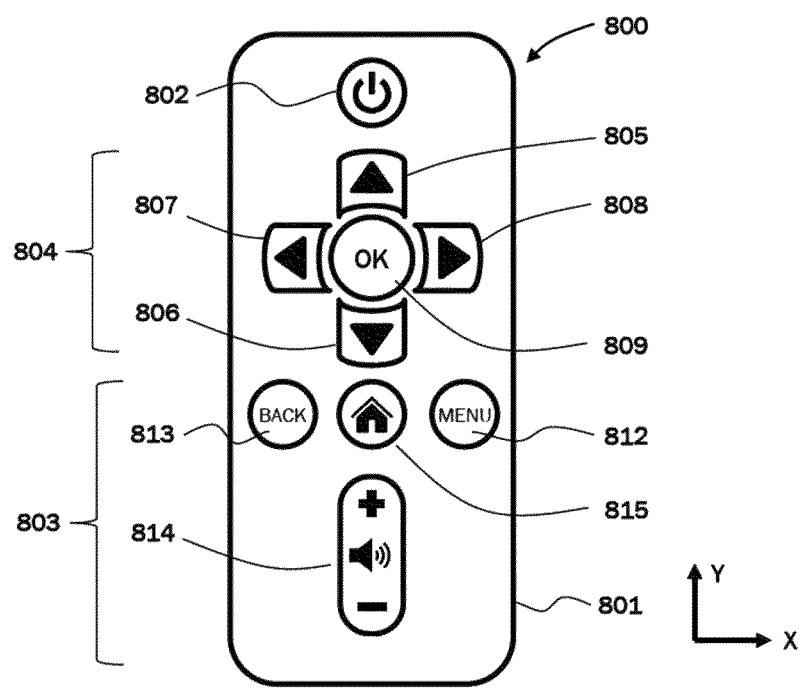
FIGS. 8A and 8B are diagrams illustrating example user devices that can be used in conjunction with an arc menu UI.
Figure 8B:
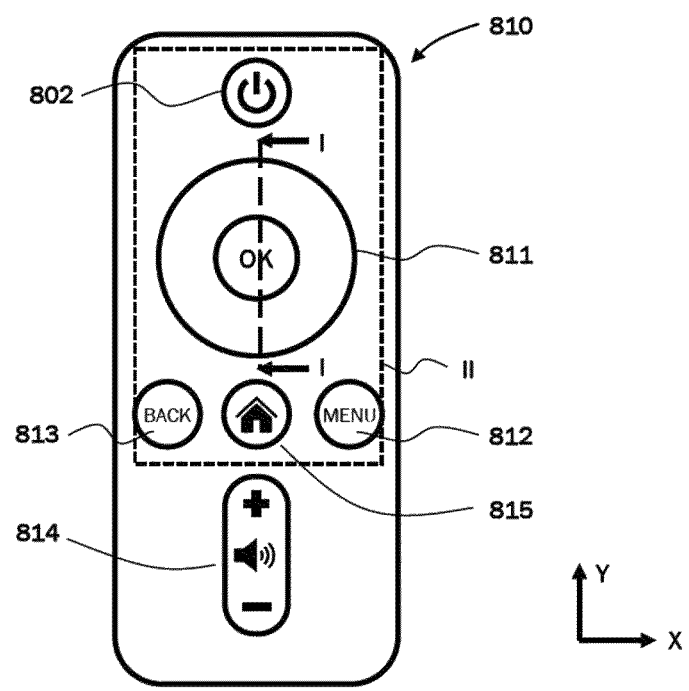

An arc menu UI enables a user to navigate a menu and browse content efficiently and intuitively with a simpler remote controller. FIGS. 8A and 8B are diagrams illustrating an example user devices 103 that can be used in conjunction with an arc menu UI. Referring to FIG. 8A, a user device 103 may be a remote controller 800 including a housing 801 which includes a plurality of function keys (or buttons) 803 such as a "Menu" key 812, a "Home" key 815, a "Back" key 813, "Vol" keys 814, a power key 802, a typical navigation keypad 804 which may include four directional keys: an up arrow key 805, a down arrow key 806, a left arrow key 807, and a right arrow key 808, and a confirmation key (e.g., "Select" or "OK" key) 809 at the center of the navigation keypad 804. However, a typical navigation keypad is intended for use with linear menu UIs to allow Up, Down, Left, and Right cursor movements.

FIG. 8B is a diagram illustrating another example of user device 103. Referring to FIG. 8B, a user device 103 may be a remote controller 810 having a navigation interface member 811 including the four directional keys of a navigation keypad arranged within a ring shaped navigation key. The other keys or buttons of remote controller 810 may be the same or similar to the keys or buttons of remote controller 800. For example, a remote controller 810 may include a housing 801 which includes a plurality of function keys (or buttons) 803 such as a "Menu" key 812, a "Home" key 815, a "Back" key 813, "Vol" keys 814, a power key 802, and a confirmation key (e.g., "Select" or "OK" key) 809 at the center of the navigation interface member 811.

In one embodiment, a user may invoke the arc menu UI by pressing a dedicated function key labeled "Menu" 812 on a remote controller 810. A user may also invoke the arc menu UI or any radial menu UI by various other ways. For example, a slight swipe on a navigation interface member 811 (e.g., navigation key) or using a navigation keypad 804 to navigate to an arc menu icon on the UI presented on the display device.

The arc menu UI or any radial menu UI may be closed or exited from in a number of ways. In one embodiment, the arc menu or any radial menu UI may automatically close after actuation of a selected menu item. For example, the menu UI may automatically close after changing a channel. In one embodiment, the menu UI may close by a defined user interaction such as pressing a dedicated function key labelled by "Back" 813 on remote controller 810. In one embodiment, the menu UI closes when the remote controller 810 detects that the user is no longer interacting with the navigation interface member 811, for example, when the user lifts off their finger from the navigation interface member, such as a navigation key or navigation ring.

Once an arc menu UI or any radial menu UI is invoked, a user may select an item from the menu. In one embodiment, a user may use a remote controller 810 having a touch-sensitive navigation interface member to navigate to a particular menu item on the arc menu or any radial menu UI. To achieve touch sensing capacitive sensors may be arranged under the navigation interface member. The screen highlight or menu item highlighter 318 (FIG. 3A) of arc menu may animate to rotate in clockwise or counterclockwise direction corresponding to the rotation of the navigation interface member. A user may press on confirmation key or "OK" key in the center of navigation interface member to select the user's choice.

A user device 103 may also be a smart phone, tablet, or mobile computing device having a touch screen running an arc menu UI application. In one embodiment, the arc menu UI application may display a virtual reproduction of the remote controller 810. For example, virtual versions of the function keys and navigation interface member arranged as shown in section II of FIG. 8B may be reproduce on the touch screen or a portion of the touch screen of the smart phone, tablet, or mobile computing device.

In one embodiment, a user may invoke the arc menu UI by pressing a dedicated virtual function key labeled "Menu" on a touch screen of a user device 103. A user may also invoke the arc menu UI or any radial menu UI by various other ways. In one embodiment, an arc menu icon or radial menu icon is displayed on a touch screen of a user device 103 and the user can select it by tapping the touch screen at the location where the menu icon is displayed. In one embodiment, a slight swipe on the touch screen of the user device 103 or a gesture with the user device 103 to navigate to an arc menu icon on the UI presented on the display device.

Once the arc menu UI or any radial menu UI is invoked, a user may select an item from the menu. In one embodiment, a user may select a menu item by pressing down on a touch screen within the angular area or sector of arc menu allocated to the particular selectable menu item.

In some embodiments, the user device 103 may be a remote controller having a wheel input unit configured to navigate an arc menu UI or any radial menu UI. The wheel input unit may include a wheel key rotating in the clockwise and counterclockwise directions, a confirmation/selection key (or OK key) disposed in the center of the wheel key, navigation keys disposed around or within the wheel key, and the screen highlight may move or rotate in the clockwise or counter-clockwise direction corresponding to the rotation of the wheel key. In selecting a choice on the menu, it is identified whether the confirmation/select key is pressed, or alternatively, whether a predetermined time has elapsed. This may be counter intuitive as a user has to move their finger from the wheel key to press the confirmation/selection key to select their choice. Waiting for a predetermined time to elapse is also not very efficient.

Referring again to FIGS. 8A and 8B, using a typical navigation keypad in tandem with an arc menu UI or any radial menu UI may inevitably cause the wrong sector to be selected or multiple sectors to be selected, i.e., "double-actuation". "Double-actuation" occurs when a user tries to select an option associated with one sector for actuation but accidentally selects and activates another option associated with a neighboring sector instead of the intended option due to the limitations of the typical navigation keypad.

Figure 9:
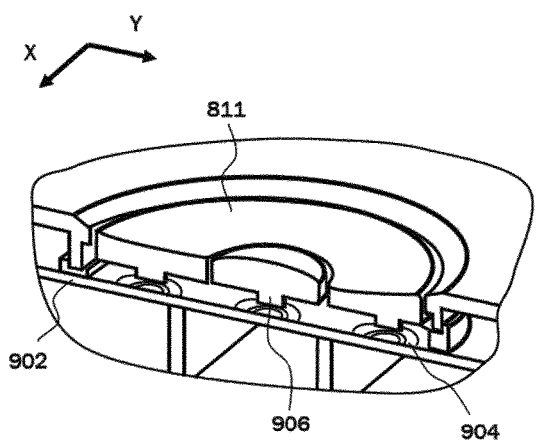
FIG. 9 shows a cross-sectional view of the remote controller illustrated in FIG. 8B along the dashed line I-I.

FIG. 9 shows a cross-sectional view of the remote controller 810 along the dashed line I-I of FIG. 8B. FIG. 9 shows a plurality of push detection elements 904b,d,e arranged on a printed circuit board 902 under a navigation interface member 811. The plurality of push detection elements 904 are positioned along the X and Y axes to be aligned with the directional keys so as to detect a key push or press of the directional keys. In some embodiments, the navigation interface member 811 may be a single continuous rigid disk-shaped key. In some embodiments, the navigation interface member 811 may include two keys, where the outer key is a rigid disk-shaped key with a hole in the middle and the inner key is a continuous disk-shaped key that fits in the hole of the outer key. The navigation interface member 811 may include a top surface configured to interact with a user's finger and a bottom surface configured with downward facing protrusions 906 corresponding to the confirmation key at the center of the navigation interface member 811 and the up, down, left, and right directional keys positioned around the navigation interface member 811. The navigation interface member 811 is positioned over the printed circuit board 902 so that each respective downward facing protrusion 906 is oriented towards a corresponding respective push detection element 904.

Referring to FIG. 9, the navigation interface member 811 may provide a five-way push-button that allows five separate push actions to be detected. For example, the printed circuit board 902 is provided with five separate push detection elements 904. The navigation interface member 811 may function as a directional pad, namely by allowing up, down, left, right commands to be provided by the user pressing the respective sides of the navigation interface member 811. Moreover, the navigation interface member 811 may allow a selection command to be provided, namely by the user pressing the center of the navigation interface member. In effect, the navigation interface member provides five separate sub-buttons. In some embodiments, the navigation interface member may provide capacitive sensing to the entire top surface of the navigation interface member over all five sub-buttons, or only to a part of the top surface, for example, over only the four directional pad sub-buttons.

Figure 10:
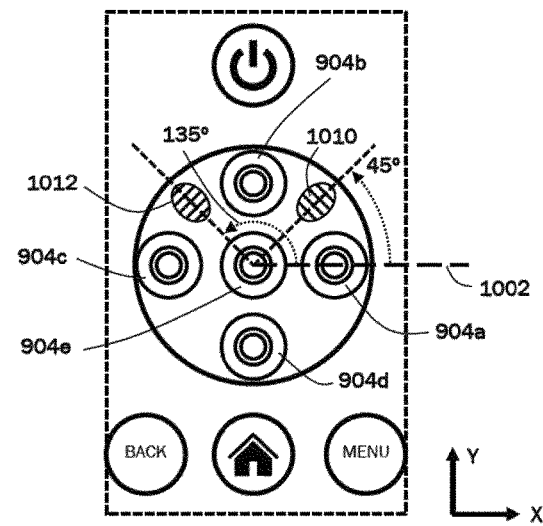
FIG. 10 shows a cut-out view of section II of the remote controller illustrated in FIG. 8B.

FIG. 10 shows a cut-out view of remote controller of the section II of FIG. 8B, showing five (5) push detection elements 904a, 904b, 904c, 904d, and 904e beneath the navigation interface member 811 (not shown explicitly). The navigation interface member 811 allows effective detection of a key press on the left and right sides in the X axis direction (e.g., along dotted line 1002) via push detection element 904a and 904c respectively by downward facing protrusions 906a and 906c of the navigation interface member 811. The navigation interface member 811 also allows effective detection of a key press on the up and down sides in the Y axis direction (e.g., orthogonal to line 1002) via push detection element 904b and 904d respectively by downward facing protrusions 906b and 906d of the navigation interface member 811. However, a key press in a diagonal direction or at an area away from the X and Y axes may cause unintentional pressing on both neighboring push detection elements due to mechanical movement restrictions of the navigation interface member 811. An "intermediate pressing region" as used herein is intended to broadly encompass any region that is diagonally between the X and Y axes, such as for example between about 30 degrees and 60 degrees relative to any two adjacent axes, in which a navigation interface member 811 alone is unable to effect a push detection effectively on keys aligned in the X axis and Y axis direction. For example, a key press action at an angular region of 45 degrees from line 1002, as shown by shaded "intermediate pressing region" 1010, may effect a push detection on both push detection elements 904a and 904b simultaneously or one after another randomly. As another example, a key press action at an angular region of 135 degrees from line 1002, as shown by shaded "intermediate pressing region" 1012, may effect unintentional push detection on both push detection elements 904b and 904c. Likewise, any key press action diagonally such as at an angular region of 225 degrees or 315 degrees from line 1002 may effect unintentional push detection on push detection elements 904c and 904d, 904d and 904a respectively. These are known as "false-actuation" or "double-actuation" events. These events may cause either a wrong function key to be detected or a key press to be ignored or voided by a control circuit of the remote controller leading to poor user experience in performing operations in a remote controller particularly when navigating a menu UI that requires key presses in the diagonal directions or in the off axes angular directions. There is a continuing need for a remote controller that facilitates improved usability with arc menu or any radial menu UI to allow seamless navigation and selection of user's choice.

In contrast to a conventional touch-sensitive navigation ring or touchpad where a user may double-tap/double-click to select, an aspect of the present disclosure relates to a user clicking anywhere within the navigation interface member to select the menu item without needing user to lift the user's finger. Accordingly, a navigation interface member needs to allow a user to click or press anywhere on the surface of navigation interface member not limiting to horizontal and vertical axes but also in any diagonal directions between horizontal and vertical directions. A remote controller that works more seamlessly with arc menu UI or any radial menu UI is described herein.

Figure 11:
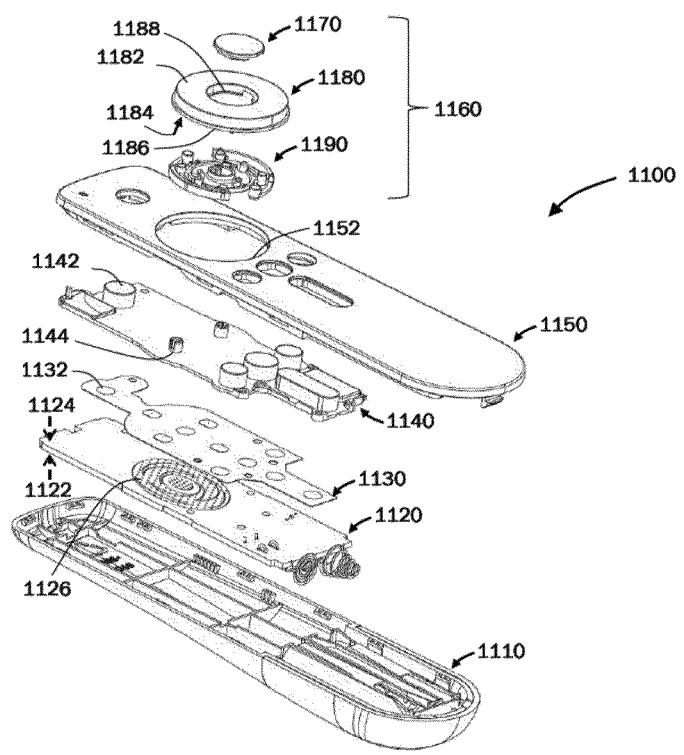
FIG. 11 shows an exploded view of an example of a remote controller according to an aspect of the present disclosure.

FIG. 11 shows an exploded view of an example of a remote controller 1100 with at least one standalone independently operable key (button) 1142 and a navigation interface assembly 1160 configured to prevent "false actuation" and "double actuation". In one embodiment, the remote controller 1100 may have a plurality of standalone independent individually operable keys (buttons) 1142. The standalone keys 1142 may include a power key, a "Back" key, a "Menu" key, a "Home" key, and volume keys.

In one embodiment, the navigation interface assembly 1160 may include a nested key assembly with several independently operable directional keys arranged along the circumference of one or more concentric rings.

In one embodiment, the remote controller 1100 may have a housing 1110 and a face panel 1150 configured to be coupled with each other in order to house internal parts. The internal parts include a printed circuit board 1120. The printed circuit board 1120 has a component side 1122 (i.e., bottom side) facing housing 1110 and a button side 1124 (i.e., top side) facing face panel 1150. The printed circuit board 1120 may include a conductive layer on the component side 1122 configured for surface mounting of electronic components. The electronic components may include a microprocessor, wireless transceiver, touch sensor processor, power supply regulator, passive components such as resistors, capacitors and inductors.

A plurality of push detection elements 1132 may be arranged on the button side 1124 of the printed circuit board 1120. Each push detection element 1132 may be arranged to correspond with one of the standalone keys 1142 or one of the nested keys of the navigation interface assembly 1160 and may be configured to detect a key press of a respective corresponding key. In some embodiments, a conductive layer may also be included on the button side 1124 of the printed circuit board 1120 and may include surface mounting electronic components (not shown).

The standalone keys 1142 and the navigation interface assembly 1160 may be arranged in an arrangement similar to the arrangement shown in FIG. 8B.

In one embodiment, a touch sensor 1126 may be provided on the button side to sense positional information of user's finger performed on the surface of one or more keys disposed over the navigation interface assembly 1160. In some embodiments, as shown in the FIG. 11, for ease of assembly, the push detection elements 1132 may be formed on a carrier membrane 1130 and a carrier membrane 1130 may be coupled to the printed circuit board 1120 by adhesive. The carrier membrane may be PET. The push detection elements 1132 may also take any other suitable form or individually assembled onto printed circuit board.

In one embodiment, the push detection element 1132 may be a switch or sensor that is actuated when a corresponding key is pressed. In some embodiments, a push detection element 1132 may be a contact sensor, a force sensor, a pressure sensor, or a capacitance-based sensor. For example, a contact sensor may be a pair of conductive contacts that form a complete circuit when the key is pressed. Alternatively, the push detection element may be metal domes (or "metal snap domes", tactile metal domes) that are momentary switch contacts that are normally-open tactile switches. When depressed by plunger or downwards protrusion of button, the metal dome may flex to provide electrical contact between two conductive tracks on the printed circuit board. Metal domes are typically made of stainless steel.

In one embodiment, a flexible pad 1140 may be arranged over the button side of the printed circuit board 1120 so as to cover the push detection elements 1132. The flexible pad 1140 may be elastic. For example, it may be made of rubber or a rubber-like material. The top side of the flexible pad 1140 may provide a base on which the plurality of buttons 1142 and the navigation interface assembly 1160 can be arranged on and to which movements of the keys (when operated) can be transferred. A plurality of downward facing protrusions may be formed or provided on the bottom side of the flexible pad 1140. The plurality of downward facing protrusions may be arranged so that each downward facing protrusion is disposed above a push detection element so that when a key is pressed, the downward facing protrusion of the key will contact a corresponding push detection element. The flexible pad 1140 may provide dampening of the force transferred from a key to the push detection elements 1132. A click feel may be determined by the diameter of the downward facing protrusions provided on the bottom side of the flexible pad 1140.

In one embodiment, the plurality of buttons 1142 and the navigation interface assembly 1160 may be mounted on the flexible pad 1140. The flexible pad 1140 may include detent members 1144, for example, a pair of C-shaped hollow posts or bores that fit with a corresponding pair of detent receiving members, for example (e.g., plunger members) of the navigation interface assembly so that the navigation interface assembly 1160 may rest on the elastic pad 1140 without shifting or rotating out of position. The navigation interface assembly 1160 may be in loose contact (removably attached) as well as be fixedly attached to the detent support on the flexible pad 1140.

In one embodiment, the face panel 1150 may be rigid and may be a part of the housing of the remote controller 1100. For example, the face panel 1150 may be made of a hard plastic or a metal. The face panel 1150 may have various openings 1152 in which the navigation interface assembly 1160 and the plurality of keys 1142 are disposed. In some embodiments, the navigation interface assembly 1160 is coupled to the face panel 1150 as well as the flexible pad 1140. The face panel 1150 usually remains stationary when the keys are operated.

In one embodiment, the navigation interface assembly 1160 may include a confirmation key 1170 and a navigation key 1180. The confirmation key 1170 may be an "OK-key" used to confirm a selection made by a user when interacting with a linear menu UI. The navigation key 1180 may be a "Cursor-key" used to navigate menu items when interacting with a linear menu UI and used to navigate menu items and confirm a selection when interacting with an arc menu UI or any radial menu UI.

The confirmation key 1170 may be a disk-shaped key including a top surface configured to interact with a user's finger and a bottom surface configured with a downward facing protrusion (not shown) extending towards a corresponding push detection element 1132 for actuating the corresponding push detection element 1132 on the printed circuit board 1120.

Figure 17A:
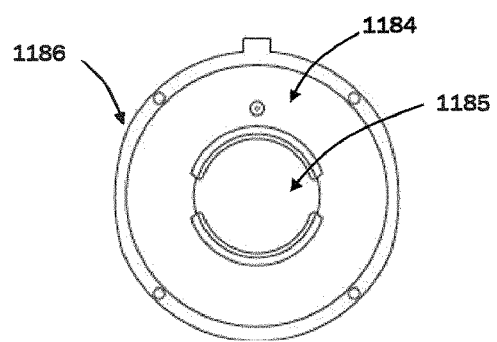
FIGS. 17A-C illustrate various views of an example navigation key button according to a preferred embodiment of the present disclosure.
Figure 17B:
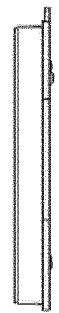
Figure 17C:
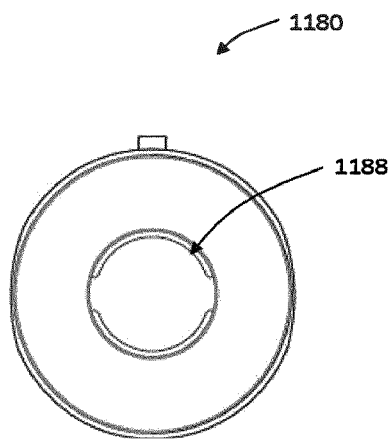
Figure 18A:
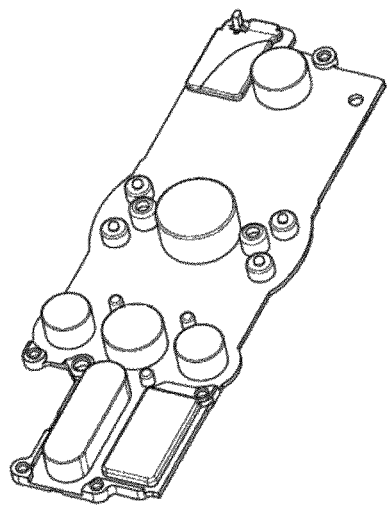
FIGS. 18A-E illustrate various views of an example flexible pad according to another aspect of the present disclosure.
Figure 18B:
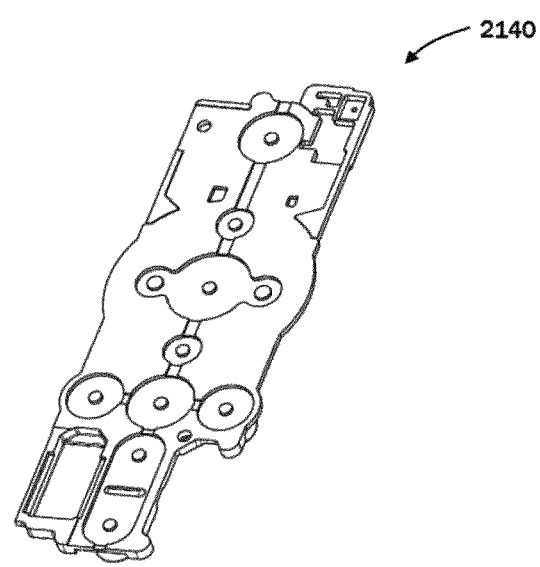
Figure 18C:
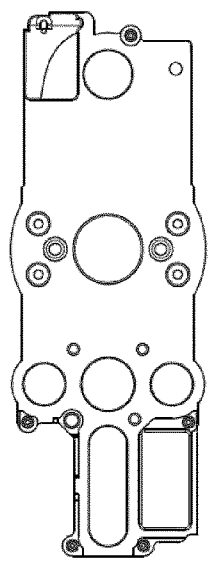
Figure 18D:
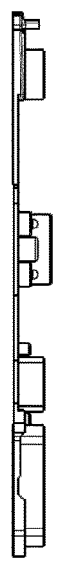
Figure 18E:
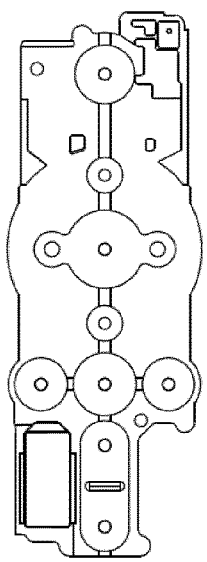

The navigation key 1180 may be a rigid disk-shaped key with a central circular opening (e.g., a ring-shaped key) in which the confirmation key 1170 is arranged. FIGS. 17A-C illustrate a bottom view, a side view, and a top view, respectively, of an example navigation key. The navigation key may include a hole 1185 for the confirmation key 1170 to extend through. The navigation key 1180 may include an annular cavity 1184 provided in the bottom surface of the navigation key 1180. The annular cavity 1184 may be configured to receive a cursor guide element 1190 from the bottom of the navigation key 1180 so that it is nested or recessed into the body of the navigation key 1180. For example, the cursor guide element 1190 may be removably coupled (e.g., snapped in) to the navigation key 1180. In an assembled state, the cursor guide element 1190 is not visible and is coupled between the face panel 1150 and the flexible pad 1140. The cursor guide element 1190 allows a user to press anywhere on the surface of the navigation key 1180 including in diagonal directions on an annular navigation key to select a menu item in the arc menu UI.

The navigation key 1180 may extend through an opening 1152 in the face panel 1150 and has a top surface 1182 configured to be touched by user and a bottom surface configured to receive a cursor guide element 1190. In one embodiment, the navigation key 1180 may include a flange 1186 extending radially outward from the base of the navigation key. The flange 1186 may have a radius larger than the diameter of the opening 1152 so that it provides a fitted arrangement of the navigation key 1180 in the opening 1152 of the face panel 1150.

Referring to FIG. 11, due to the limited space, although a plurality of keys and their corresponding push detection elements and face panel holes are illustrated, only one of the keys and its corresponding push detection element and only the largest face panel hole are indicated by reference numerals.

Figure 12A:
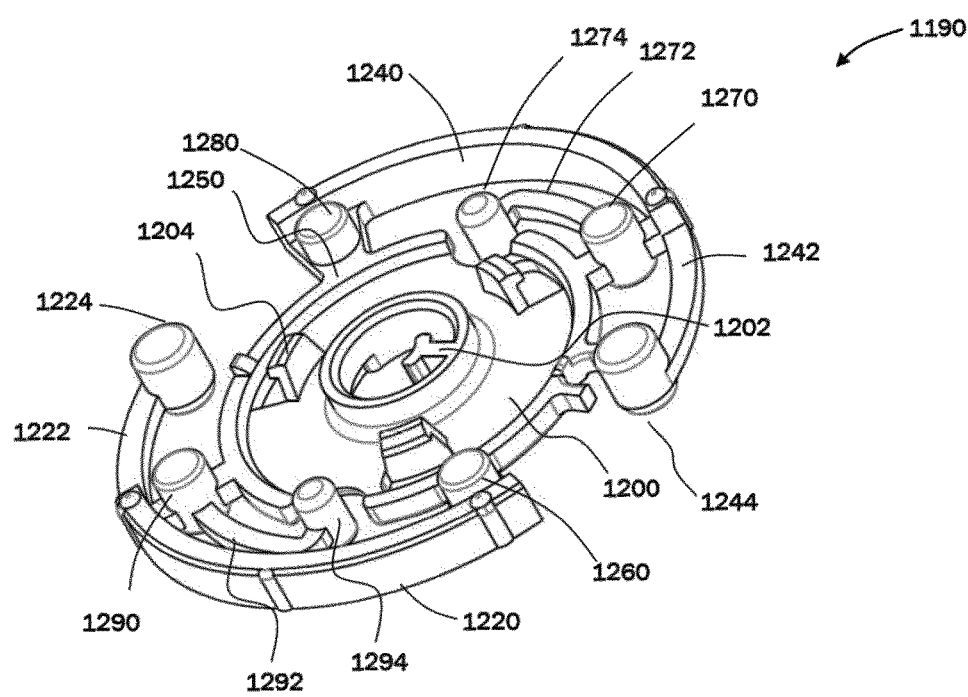
FIG. 12A is a diagram illustrating an example of a cursor guide element configured to prevent false actuation and double actuation according to an aspect of the present disclosure.

FIG. 12A is a diagram illustrating an example of a cursor guide element 1190 that prevents "false actuation" and "double actuation". FIGS. 12B-12G are diagrams corresponding to a top view, a bottom view, and various side views, respectively, of the example cursor guide element 1190 of FIG. 12A. In one embodiment, the cursor guide element 1190 has a circular base 1200 and four supporting arms 1250 that extend radially outward from the circular base. The four supporting arms 1250 are symmetrically distributed around the circular base at angular directions that are 90 degrees apart from each other. For example, referring to FIG. 12B, the supporting arms 1250 may be arranged to extend from the circular base 1200 at the angular directions of 45 degrees, 135 degrees, 225 degrees and 315 degrees relative to the X axis. A pair of arced frames 1220 and 1240 that partly encircles the circular base 1200 may be coupled to the radially extended ends of the supporting arms 1250.

The pair of arced frames may be arranged to have the same radial spacing (i.e., radius) from the center of circular base 1200. Four cylindrical posts or stoppers 1260, 1270, 1280, and 1290 respectively extend upwardly from the four supporting arms 1250.

The cursor guide element 1190 may have actuating elements including two outer leaf springs 1222 and 1242, two inner leaf springs 1272 and 1292 and four key plunger members 1224, 1244, 1274, and 1294. The leaf springs may be cantilevered leaf springs. The outer leaf spring 1242 may extend circumferentially from one end of the arced frame 1240. The free end of the outer leaf spring 1242 may be coupled to a key plunger member 1244 corresponding to an "Up" key. Likewise, an outer leaf spring 1222 may extend circumferentially from arced frame 1220. The free end of the outer leaf spring 1222 may be coupled to a key plunger member 1224 corresponding to a "Down" key. The outer leaf springs 1222 and 1242 may be arced and the radius may be the same as a radius of the arced frames 1120 and 1240. The inner leaf spring 1272 may extend circumferentially from post 1270. The free end of the inner leaf spring 1272 may be coupled to a key plunger member 1274 corresponding to a "Left" key. Likewise, the inner leaf spring 1292 may extend circumferentially from post 1290. The free end of the inner leaf spring 1292 may be coupled to a key plunger member 1294 corresponding to a "Right" key. The outer and inner leaf springs are thinner than the supporting arms and arc frames. The outer and inner leaf springs may be curved or arced.

The key plunger members 1224, 1244, 1274, and 1294 may be dimensioned to fit snugly within navigation key 1180. Each key plunger member may have a cylindrical body or generally cylindrical body (e.g., oval cross section) with a top surface that is flat or substantially flat. Each key plunger member rests on the flexible pad 1140 and the respective leaf spring coupled to each key plunger member allows the plunger member to freely travel a little distance downwards which is sufficient to actuate the corresponding push detection element 1132. For example, the travel distance may be about 0.2 mm.

The height of the key plunger members may be different relative to each other. The difference may be based on a radial distance of the key plunger members. The radial distance of a first pair of key plunger members disposed along a first axis may be longer than the radial distance of a second pair of key plunger members disposed along a second axis orthogonal to the first axis.

Figure 13A:
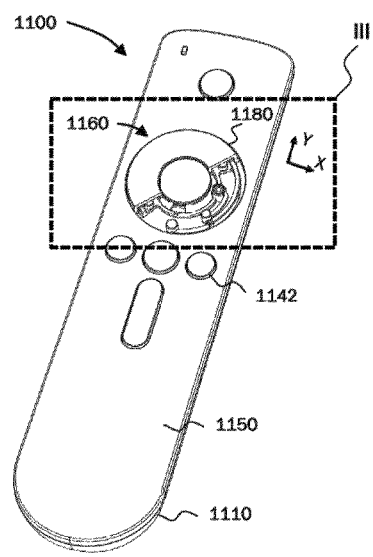
FIG. 13A illustrates a perspective view of a remote controller according to an aspect of the present disclosure.
Figure 13B:
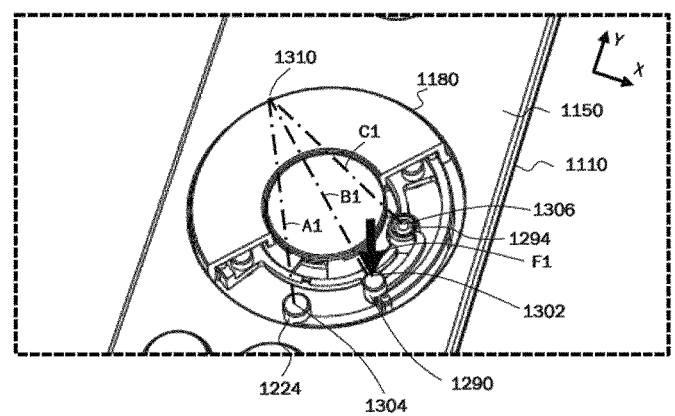
FIG. 13B shows an enlarged cut-out view of section III of the remote controller illustrated in FIG. 13A.
Figure 13C:
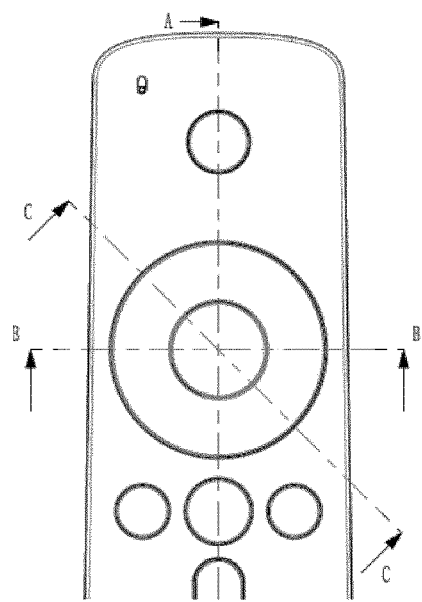
FIG. 13C illustrates a top view of the remote controller of FIG. 13A.
Figure 13D:
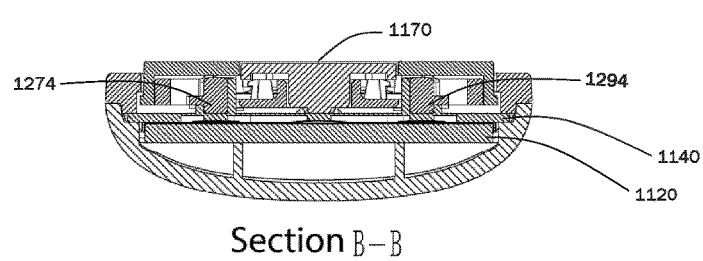
FIG. 13D illustrates a cross-sectional view of the remote controller illustrated in FIG. 13C along the dashed line B-B.
Figure 13E:
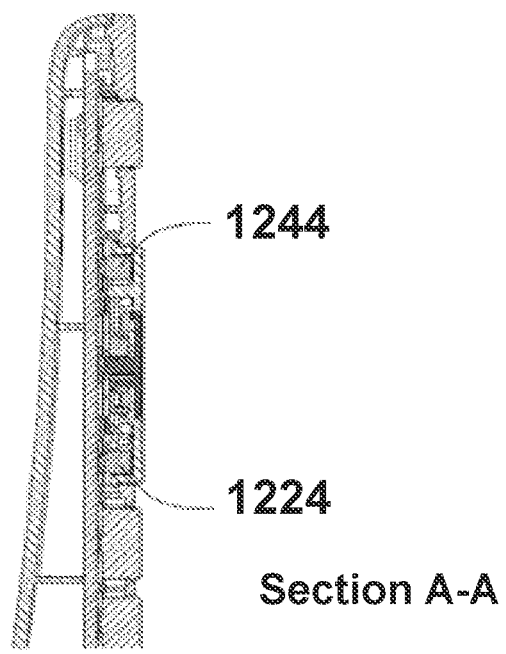
FIG. 13E illustrates a cross-sectional view of the remote controller illustrated in FIG. 13C along the dashed line A-A.
Figure 13F:
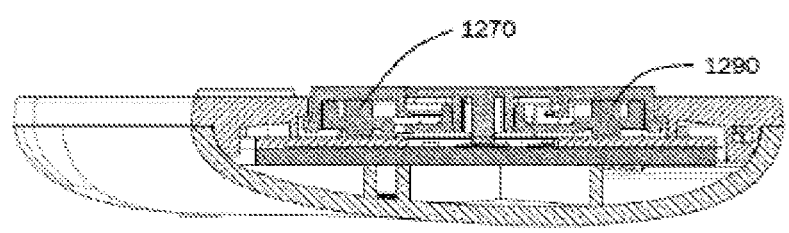
FIG. 13F illustrates a cross-sectional view of the remote controller illustrated in FIG. 13C along the dashed line C-C.

FIGS. 13D, 13E and 13F show cross-sectionals views of an example navigation interface assembly illustrated in FIG. 13C along dashed lines B-B, A-A and C-C, respectively. Referring to FIGS. 13D, 13E, and 13F, when the radial distance of the "Up"/"Down" plunger members is greater than the radial distance of the "Left"/"Down" plunger members, there should be no gap between the top surface of the "Up" and "Down" plunger members and the underside of navigation key, whereas there should be a small gap (for example, about 0.2 mm) between the top surface of the "Left" and "Right" plunger members and the underside of navigation key. When a user is applying a downward pressure near the "Up" position of the navigation key 1180, the downward pressing action of a user may be directly coupled from the navigation key to the "Up" plunger 1244 to the flexible pad 1140 so that the downward facing protrusion of the flexible pad under the "Up" plunger contacts the push detection element 1132. Similarly, when a user is applying a downward pressure near the "Down" position of the navigation key 1180, the downward pressing action of a user may be directly coupled from the navigation key to the "Down" plunger 1224 to the flexible pad so that the downward facing protrusion of the flexible pad 1140 under the "Down" plunger contacts the push detection element 1132. There should be a small gap between the "Left" and "Right" plungers and the navigation key. For example, there may be a small gap (e.g., about 0.2 mm) between the navigation key and "Left" and "Right" plungers. The small gap provides additional travel distance to actuate a push detection element thereby preventing "false actuation" and "double actuation". Alternatively, when the radial distance of the "Up"/"Down" key plunger members is less than the radial distance of the "Left"/"Right" key plunger members, there should be no gap between the top surface of the "Left" and "Right" key plunger members and the underside of the navigation key, whereas there should be a small gap between the "Up" and "Down" plungers and the navigation key.

Additionally, the flexible pad 1140 may be configured to provide a predetermined, necessary amount of elasticity required so that a push detection element 1132 may be actuated by any of the four plungers and provide a tactile feeling with a "click" effect. The flexible pad 1140 may also function to reduce the audible "click" and may further extend the life span of the push detection element 1132 by insulating the surface of the push detection element 1132 from direct impact of the plunger during actuation.

The relative height of the plungers and posts is an important aspect. For example, the height of the post/stopper has to be adjusted to balance the click feel of the "Left" and "Right" key while preventing "false actuation" or "double actuation". There is no gap between the top surface of the posts and the underside of the navigation key 1180. However, there is a small gap, for example, of about 0.2 mm between the bottom surface of the posts and the flexible pad 1140, as shown in FIG. 13F. The small gap is necessary to allow downward travel when user presses diagonally between X and Y axis. The plungers with greater radial distance (e.g., "Up" and "Down" plungers) will actuate the push detection element first. If there is no gap, then a user is unable to press down diagonally or will have poor click feel. If gap is too big, for example about 0.4 mm, then double actuation may occur if user presses downward more than 0.2 mm, actuating an "Up" or "Down" plunger and further actuating a "Left" or "Right" plunger. Hence the post acts as a "stopper" If user presses harder, the post/stopper will act to stop the navigation key to move further downwards.

In one embodiment, the "Left" key plunger member 1274 and "Right" key plunger member 1294 coupled to post 1270 and 1290 via inner leaf springs, may have a smaller diameter dimension as compared to the "Up" key plunger member 1244 and "Down" key plunger member 1224 coupled to arced frames 1220 and 1240 via outer leaf springs. The diameter of the Left/Right plunger may be smaller due to space constraint within the underside of navigation key 1180 to allow room for plungers and detent members.

The configuration of components of the cursor guide element 1190 is not limited to the examples provided. Alternatively, a mirrored configuration of the components or rotated configuration of the components may also be used.

In one embodiment, the cursor guide element 1190 is made from plastic for example ABS material and is integrally formed (e.g., molded) as a single piece.

Referring again to FIG. 11, in one embodiment the remote controller 1100 includes a touch sensor 1126. The touch sensor 1126 may be a capacitive touch sensor arranged under the navigation interface assembly 1160 and disposed as a layer between the push detection elements 1132 or a carrier membrane 1130 upon which the push detection elements 1132 are provided and the printed circuit board 1120. The touch sensor 1126 may be sensitive to input by one or more input objects (for example, fingers, styli, etc) on the navigation key 1180 and/or the confirmation key and is configured to provide information about the position of an input object (e.g., a finger) on the navigation key 1180 and/or the confirmation key 1170. The sensing distance to which the sensor extends in a particular direction may be on the order of less than a millimeter, millimeters, centimeters, or more, and may vary with the types of overlay material above the sensor and the accuracy desired. A touch sensor may be provided under the navigation key 1180 and/or the confirmation key 1170 and configured to provide positional information of an input object on the navigation key 1180 and/or confirmation key 1170. A capacitive type touch sensor 1126 may be configured to sense when a user touches or hovers their finger over the surface of the navigation key 1180 and/or the surface of the confirmation key 1170.

Various types of capacitive sensors may be used and are not limited to the following, self-capacitance sensing and mutual capacitance sensing sensors which are well-known in the art. For example, a suitable capacitive sensor may be selected based on the combination of values that need to be detected to provide multi-dimensional positional information (for example, two-dimensional horizontal/vertical axes, angular/radial axes, or any other combination of axes that span multiple dimensions). In some embodiments, a capacitive type touch sensor 1126 and associated control circuit may be configured to detect a one-dimensional swiping action being performed on the top surface 1182 of navigation key 1180. The term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like.

Operatively, in one embodiment, a user may swipe left or swipe right on a touch sensitive navigation key of a user device 103 and the user device 103 may relay this action to a media client device 101. The media client device 101 may update a display to reflect a change corresponding to the gesture. For example, during channel dialing, at least one character entry field is presented on a display device 102. The number displayed in the character entry field may increment by 1 with a clockwise swipe or a decrement by 1 with a counterclockwise swipe. In another example, a user device 103 may send relative position-type information to the media client device 101, in addition to absolute position-type information, to effect a less tedious character entry. For example, the number displayed in the character entry field may be incremented or decremented by a number corresponding to a direction and circumferential distance of a user's swipe. Referring to FIG. 5B, an arc dialer UI is displayed with an arc dialer 513 and three character entry fields 514. The arc dialer 513 may be divided or mapped to a number of sectors or positions depending on the character entry field. Referring to FIG. 5B, although each character entry field may be a digit from '0' to '9', the arc dialer 513 may for example be divided or mapped to 6 positions or sectors. The media client device 101 may send information related to the configuration of the arc dialer 513 to the user device 103 (e.g., number of positions or sectors). The user device 103 may determine a correspondence between the configuration of the arc dialer 513 and the positional data provided by a touch sensor, e.g., an annular touch sensor arranged under a navigation key. During a dialing swipe on an arc dialer, depending on the direction of the swipe and the difference between the starting finger position and ending finger position around a navigation key, a relative positioning is mapped and information indicating how many times to increment or decrement a displayed digit in a character entry field is transmitted. For example, when a remote controller detects a clockwise swipe around one third of a circumference of an annular touch sensitive navigation key (e.g., corresponding to the arc dialer), the remote controller may send to the media client device information indicating an increase of 2 to 3 relative positions or sectors to effect a corresponding 2 to 3 increment in the digit displayed in the character entry field.

FIG. 13A illustrates an example of remote controller 1100 including a housing 1110, a face panel 1150, a plurality of single buttons 1142, and a navigation interface assembly 1160 when assembled with a partial cut out view showing a portion of the cursor guide element 1190. In one embodiment, a user may navigate menu items on an arc menu UI presented on a display by moving their finger along the annular dimension of the navigation key 1180. The capacitive sensor 1126 and associated control circuit may be configured to detect information about the absolute positioning of a finger. In some embodiments, the capacitive sensor 1126 and associated control circuit may be configured to detect the relative movement of a finger by comparing subsequently sensed finger positions. The control circuit of the remote controller 1100 may be configured to automatically send a wireless control signal to a media client device which may effect a corresponding UI animation based on the information provided by the capacitive sensor 1126.

In the assembled state (FIGS. 13A and 13B), the four posts may be geometrically located diagonally at angular region of 45 degrees between X axis and Y axis. FIG. 13B shows an enlarged cut-out view of section III of the example remote controller illustrated in FIG. 13A. When a user presses downward on the navigation key 1180 with force F1 at location 1302 diagonally between X and Y axis, the navigation key 1180 tilts downwards towards the housing 1110. Location 1302 is at the vicinity and above post 1290. Referring to FIG. 13B, the tilting or rocking movement of navigation key 1180 forms an imaginary pivot 1310 on the navigation key 1180 at a diagonally opposite position from the location where the user presses. The rotational moment imparted by force F1 is defined by the product of the force F1 exerted on navigation key 1180 and the distance B1 between the point of contact 1302 and the pivot point 1310. Distance B1 is also referred to as moment arm. For example, the distance A1 between pivot point 1310 and contact point 1304 of the "down" key plunger member 1224 also defines a moment arm, and the distance C1 between pivot point 1310 and contact point 1306 of the "right" key plunger member 1294 also defines a moment arm. For example, the downwards force asserted on the navigation key 1180 at location 1302 may be transferred to the "down" key plunger member 1224 and actuate the corresponding push detection element because the moment arm defined by distance A1 is longer than the moment arm defined by distance C1. The post 1290 prevents the navigation key 1180 to move further downwards to cause "right" key plunger member 1294 to effect full actuation. This prevents the "false actuation" or "double actuation" problem because only one push detection element 1132 may be fully activated. The single actuation of a push detection element may provide a signal to control circuit of the remote controller 1100 to facilitate selection of menu item on the arc menu UI.

In addition to the angular position, the radial position of the posts may also effect the moment arm. In one example, the radial distance of the posts is the same and the radial distance of the posts is between the radial distance of a first pair of key plunger members ("Up" and "Down") and the radial distance of a second pair of key plunger members ("Left" and "Right").

In some embodiments, a round navigation key or a cross shaped cursor may be designed on a remote controller for aesthetical purpose or industrial design definition to work with linear menu or conventional menu with cardinal locations. In such applications, user may at times accidentally press slightly off cardinal axis that causes false actuation or double actuation, leading to poor user experience. The cursor guide element 1190 can also be used in these navigation key assemblies in which the directional keys are provided as nested keys under an annular shaped key, an integral cross shaped cursor key, and the like. The cursor guide element 1190 would also prevent false actuation and double actuation in such navigation key assemblies.

In some embodiments, the cursor guide element 1190 and opening 1152 in the face panel 1150 provides additional (positive-locking) means for holding the navigation interface assembly 1160 with respect to the flexible pad 1140 and the face panel 1150.

In some embodiments, referring to FIGS. 11 and 12, the center of circular base 1200 may further include outer catches 1204 that engage with corresponding flanges 1188 at the inner surface of the center opening of the navigation key 1180. The outer catches and corresponding flanges provide coupling of cursor guide element 1190 and the navigation key 1180 by a snap-in mechanism. In some embodiments, the center of the circular base 1200 may include a detent member 1202. The detent member 1202 may be a T or Y-shaped protrusion. A confirmation key 1170 may have a detent engaging member on its bottom side. The detent engaging member may be a cavity on the bottom side of the confirmation key 1170 that corresponds to the shape of detent member 1202. This reduces side-to-side or rotational movement of the confirmation key 1170 while allowing downward movement to actuate a corresponding push detection element 1132 when a user presses the confirmation key 1170.

Figure 12B:
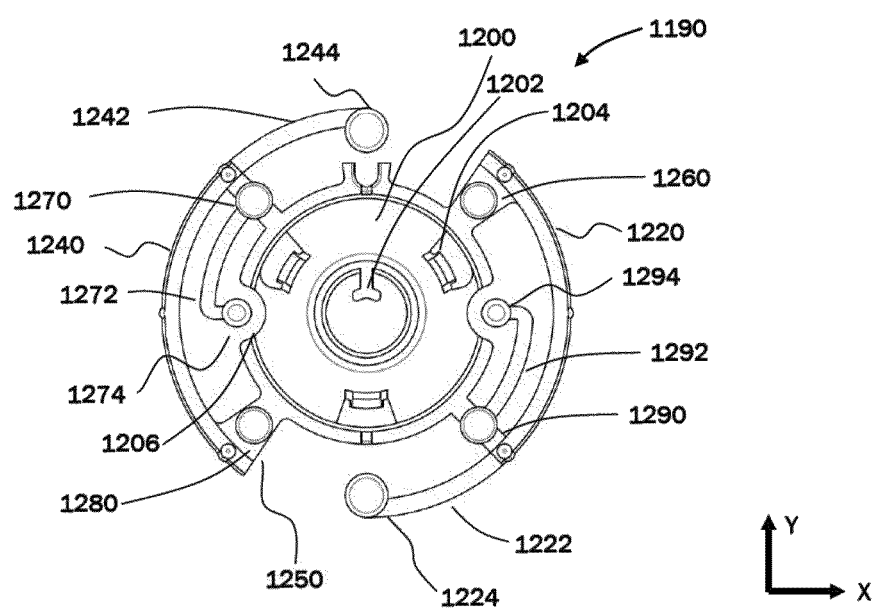
Figure 12C:
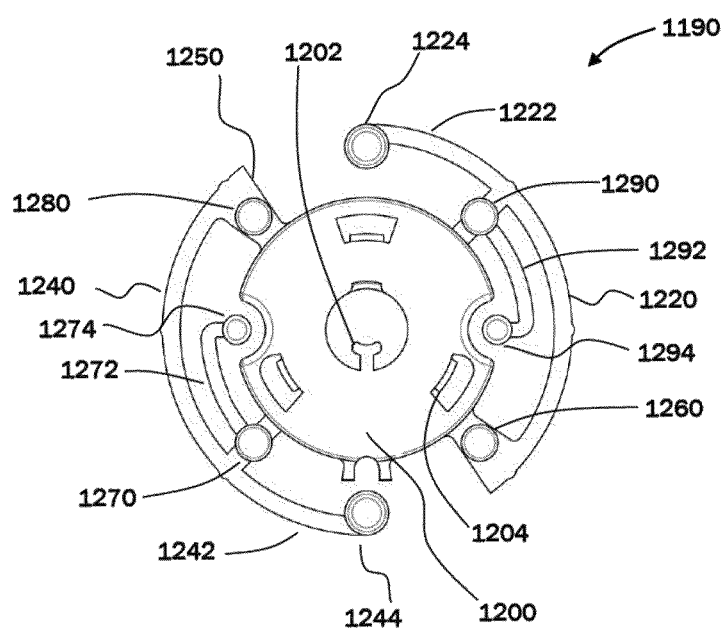

In some embodiments, the navigation interface assembly 1160 may be coupled to the flexible pad 1140. Detent members 1144 may be provided on the flexible pad 1140. Detent members 1144 may be for example C-shaped hollow posts or bores extending upwardly from the flexible pad 1140. Corresponding detent engaging members 1206 may be provided in the cursor guide element 1190 of the navigation interface assembly 1160. Referring to FIG. 12B, the circular base 1200 of the cursor guide element 1190 may include one or more notches that can be used as detent engaging members 1206. For example, the notches on the cursor guide element 1190 and the C-shaped hollow posts on the flexible pad 1140 may be aligned so that the C-shaped hollow posts are arranged to fit between the circular base 1200 and the key plunger members 1274 and 1294 in the notched areas. Engaging the notches with corresponding C-shaped bores provide a definite positioning of the assembled navigation interface member 1160 relative to the flexible pad 1140. The detent members 1144 and detent engaging members 1206 should be configured to allow the key plunger members to freely travel.

In another embodiment, the cursor guide element may be eliminated. To achieve prevention of "false actuation" and "double actuation", parts of the cursor guide element may be integrated into the navigation key and the flexible pad. FIGS. 18A-E illustrate a top perspective view, a bottom perspective view, a top view, a side view, and a bottom view of a flexible pad 2140 according to another aspect of the present disclosure. For example, the "Up" and "Down" key plunger members may be integrated into the navigation key 2180 and the "Left" and "Right" key plunger members may be integrated into the flexible pad 2140. The four posts/stoppers may also be integrated into flexible pad 2140. The working principle is the same with plungers' and posts' position designed to have different moment arm. Rather than adjusting the relative height, the position of the posts may be arranged to effectuate different moment arms. In this embodiment, the four (4) posts are disposed at about +/−30 degrees from a first axis (e.g., the x-axis). There is no gap between the navigation key and plungers. The radial distance of the key plunger members disposed along the first axis is shorter than the radial distance of the key plunger members disposed along a second axis orthogonal to the first axis (e.g., the y-axis). This embodiment may be less suitable for a remote controller having a touch sensor under the navigation key.

Figure 14:
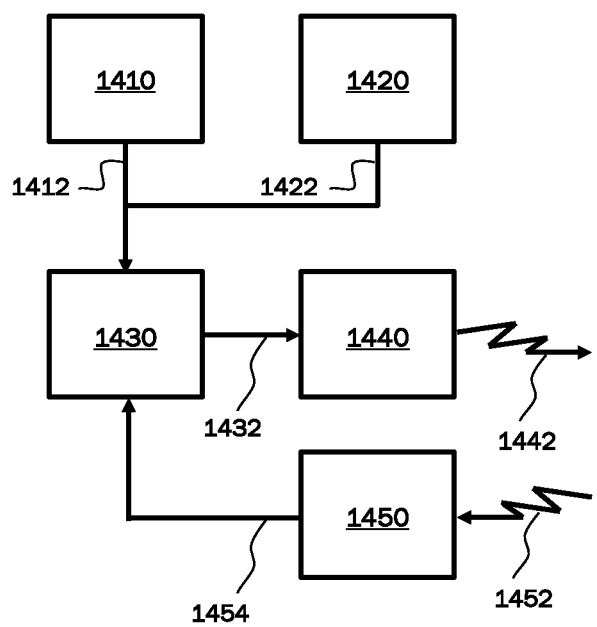
FIG. 14 shows a block diagram of an example of a circuit of a remote controller according to an aspect of the present disclosure.
Figure 15:
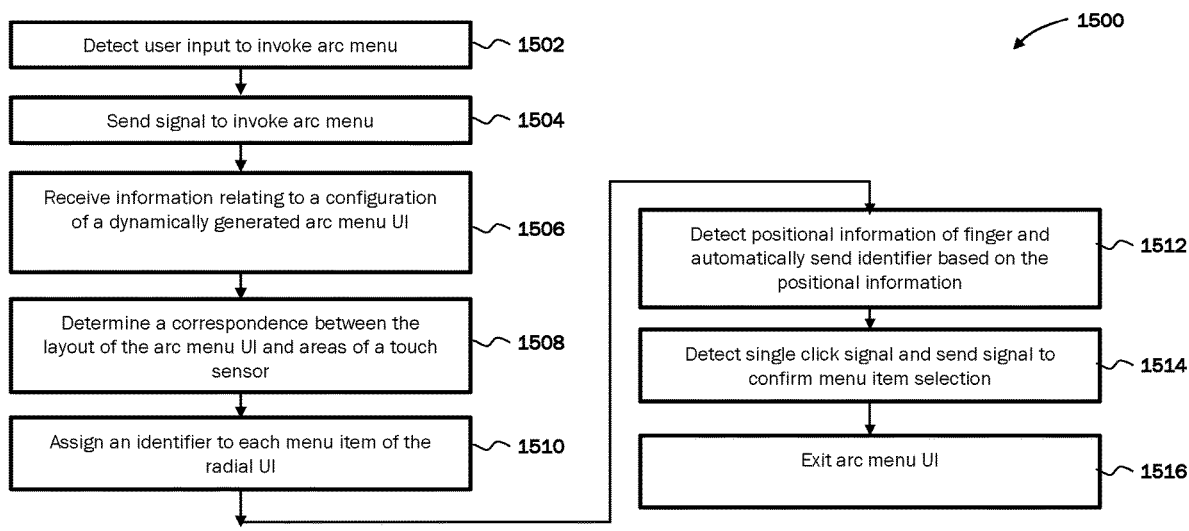
FIG. 15 shows a flowchart of a method for interacting with an arc menu UI according to an aspect of the present disclosure.
Figure 16:
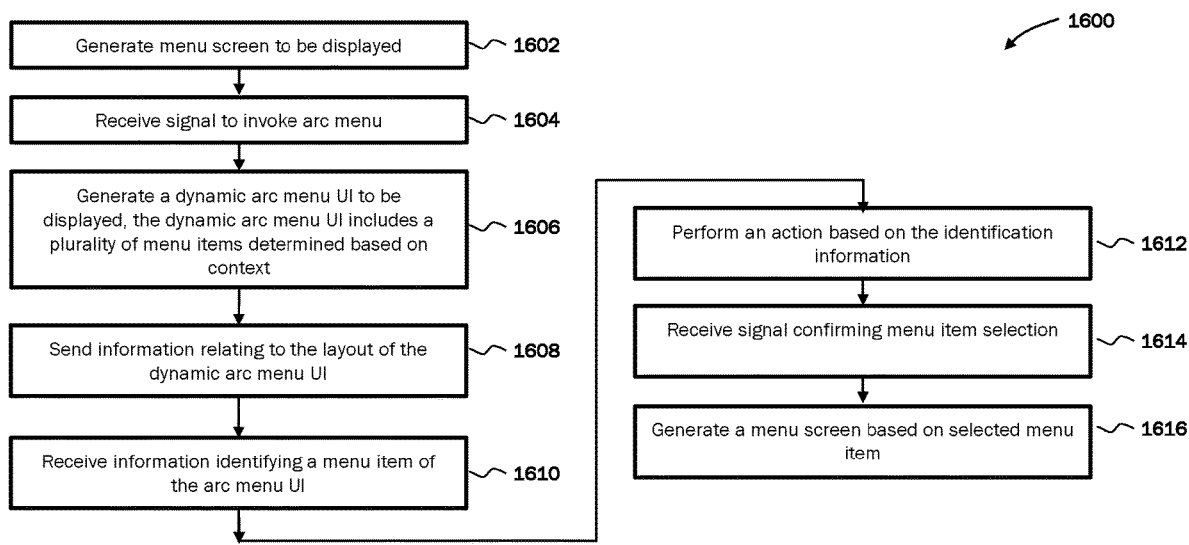
FIG. 16 shows another flowchart of a method for interacting with an arc menu UI according to an aspect of the present disclosure.
Figure 19A:
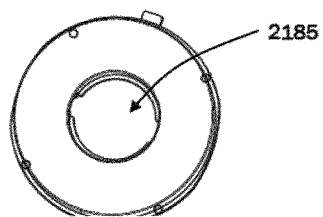
FIGS. 19A-E illustrate various views of an example navigation key button according to another aspect of the present disclosure.
Figure 19C:
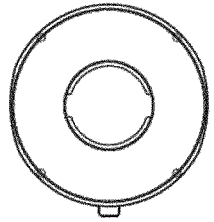
Figure 19D:
Figure 19B:
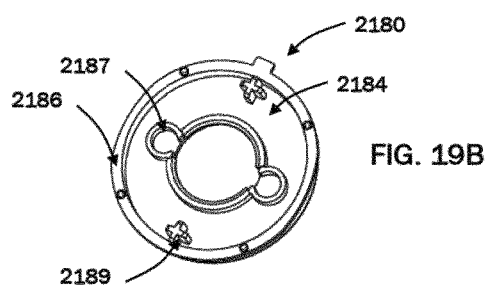
Figure 19E:
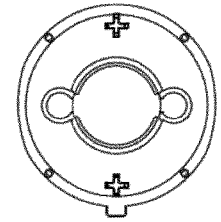
Figure 20:
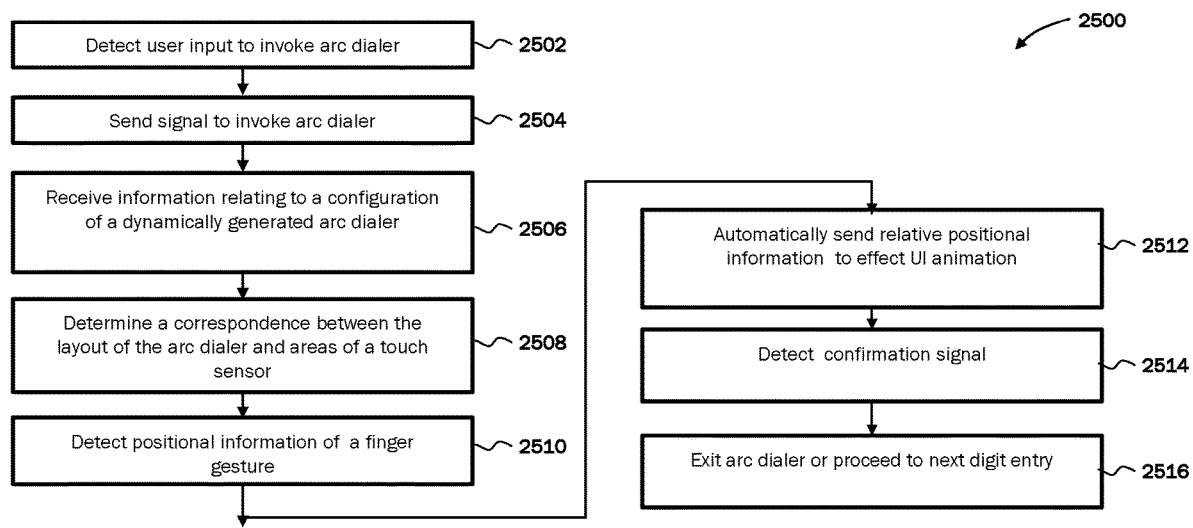
FIG. 20 shows a flowchart of a method for interacting with an arc dialer UI according to an aspect of the present disclosure.
Figure 21:
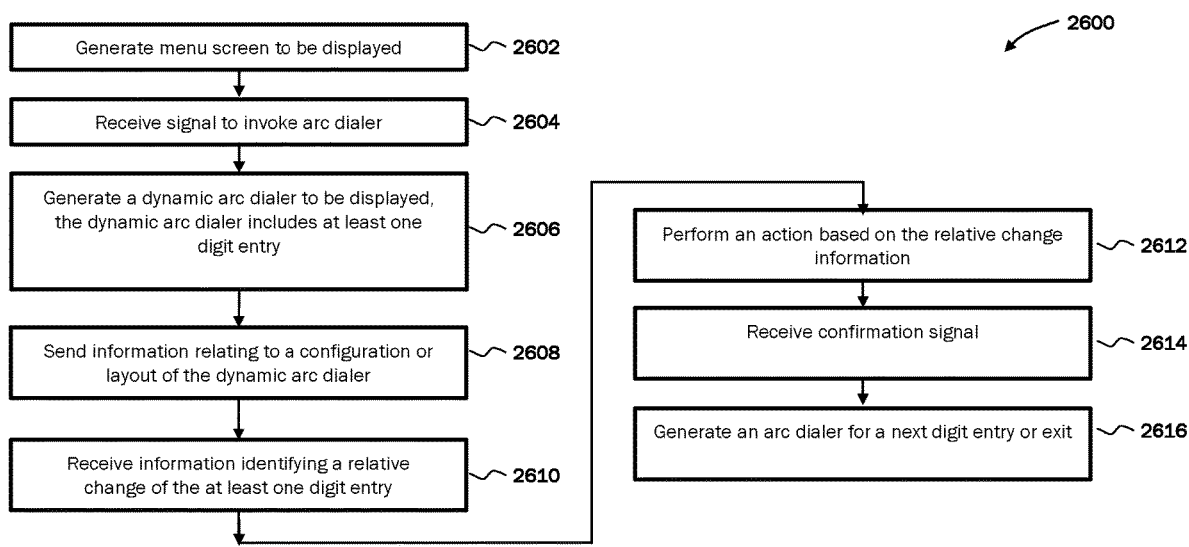
FIG. 21 shows another flowchart of a method for interacting with an arc dialer UI according to an aspect of the present disclosure.

The navigation key 2180 may be a rigid disk-shaped key with a central circular opening (e.g., a ring-shaped key) in which a confirmation key 2170 (not shown in FIG.) is arranged. FIGS. 19A-E illustrate a top perspective view, a bottom perspective view, a top view, a side view, and a bottom view, respectively, of an example navigation key. The navigation key may include a hole 2185 for the confirmation key 2170 to extend through. Referring to FIG. 19B, the navigation key 2180 may include detent members 2187 and "Up" and "Down" key plunger members 2189. Detent members 2187 may fit with a corresponding pair of "Left" and "Right" key plunger members formed on flexible pad 2140 so that the navigation key 2180 may rest on the elastic pad 2140 without shifting or rotating out of position FIG. 14 is a block diagram of an example of a circuit of the remote controller 1100. For example, FIG. 14 illustrates a circuit for interacting with a media client device. The circuit may include a key press detector 1410, a capacitive sensor 1420, and control circuit 1430, a wireless transmitter 1440, and a wireless receiver 1450. A key press detector 1410 may generate a key press signal 1412 when a key press of one of the function keys 1142 or one of the subkeys (i.e., directional keys or confirmation key) of the navigation interface assembly 1160 is detected. The key press signal 1412 which contains information about which key is pressed may be provided to a control circuit 1430 which may then effect a control function based on the key pressed, such as an "OK". The capacitive sensor 1420 may be configured to detect a swiping gesture. The capacitive sensor 1420 may generate a key swipe signal 1422 when a one-dimensional swiping action of the user performed on the top side 1182 of navigation key 1180 is sensed. The key swipe signal 1422 may be provided to the control circuit 1430 which may then effect a function based on the key swipe signal 1422. The control circuit 1430 may provide a control signal 1432 to the wireless transmitter 1440. The control signal 1432 may include information about which key press or gesture was detected. The wireless transmitter 1440 may be an IR or RF transmitter or a wireless transmitter based on Wi-Fi, Bluetooth or ZigBee wireless technology. The wireless receiver 1450 may receive information via receive wireless signal 1452 from a media client device and may provide information signal 1454 to the control circuit 1430. The information signal 1454 may include information and/or configuration parameters (for example, the number of sectors and the angular angles of each sector corresponding to the menu items of the arc menu UI being presented). In another embodiment, the functionality of wireless receiver 1450 and wireless transmitter 1440 may be combined or integrated.

FIGS. 15, 16, 20, and 21 are flowcharts of methods 1500, 1600, 2500, and 2600 for an arc menu UI implementation in one or more embodiments of the present disclosure. Although the blocks are illustrated in a sequential order, the processes associated with these blocks may also be performed in parallel, and/or in a different order than those described herein. Also, the processes of the various blocks may be combined, divided into additional blocks, and/or eliminated based upon the desired implementations. Method 1500 shall be described with reference to FIGS. 1, 3B, 8B, 13A, 14, and 15. However, method 1500 is not limited to the example embodiment.

At 1502, user device 103 may detect a signal to invoke arc menu. For example, remote controller 1100 may detect a key press, a touch contact, or a gesture from the user to invoke arc menu.

At 1504, user device 103 may transmit a signal to media client device 101 indicating a request for an arc menu UI. For example, remote controller 1100 may send an instruction via transmit wireless signal 1442 to media client device 101 to invoke an arc menu UI to be presented on display device 102. It is understood that a user may exit the arc menu UI at any time and return to 1502. If a user does not exit the arc menu UI, user device 103 automatically proceeds to 1506 and awaits further user interaction.

At 1506, user device 103 receives a signal from media client device 101 which may include information about the layout or presentation of the arc menu UI, such information may relate to the number of sectors, the size of the sectors, the position of the sectors, and the menu item associated with each sector.

At 1508, user device 103 may determine a correspondence between touch sensor points and the layout of the arc menu UI. For example, the user device may generate a calibrated mapping based on the received arc menu UI configuration information and angular regions detectable by a positional sensor. For example, control circuit 1430 of remote controller 1100 may configure a local representation (e.g., a map or table) based on the number, size, and position of the sectors, their corresponding menu items, and associated sensor data. A processor may determine for each sector an associated range of positional data from a positional sensor that would if detected correspond to the sector. Once a correspondence (e.g., calibrated mapping) is determined, a sector can be detected based on the positional information provided by a positional sensor. Control circuit 1430 may use the determined correspondence (e.g. local representation) to determine a particular sector based on the positional information provided by a capacitive touch sensor 1126. For example, as illustrated in FIG. 3B, the information received from media client device 101 indicates five sectors that are equally spaced with 72 degrees in each sector where the top menu item for "Setting" corresponds to a sector associated with the angular region from 55 degrees to 126 degrees relative to the X-axis. The top menu item/sector for "Setting" would be associated with the range of detectable positional data corresponding to this angular region. Likewise, any positional information determined by a control circuit may be a suitable indicia of an object's presence (e.g., finger) on the navigation interface assembly 1160 sensed by capacitive sensor.

At 1510, user device 103 may assign each sector with a unique identifier corresponding to each selectable menu item on the arc menu UI presented on display. For example, an identifier F1 for "Setting", F2 for "VOD", F3 for "Live TV" and the like. For example, remote controller 1100 may determine that any positional information sensed by capacitive touch sensor 1126 between an angular region of 55 degrees to 126 degrees will be assigned an identifier F1. The identifiers may be predetermined between the user device 103 and the media client device 101. Alternatively, the identifiers may be determined ad hoc based on a predetermined algorithm.

At 1512, user device 103 may automatically send positional information of user's finger to effect UI animation. For example, a user may navigate along annular dimension of navigation key 1180 and may pause their finger when the menu item highlighter 318 at "Setting" is highlighted. The control circuit may automatically transmit the identifier F1 which corresponds to sector denoted by F1. The positional information of user's finger may be sensed by a capacitive sensor and may be continuously sent via transmit wireless signal 1442 to media client device 101 during finger's movement to effect UI animation to rotate menu item highlighter 318 and settle at "Setting". The user's finger may pause at an angular region of 60 degrees, and the user may proceed to press down on the navigation key 1180 to confirm the selection. When using a remote controller 1100 including navigation interface assembly having a cursor guide element 1190, even a key press at an angular region of 60 degrees would not cause false actuation or double actuation. In another embodiment, user may effect a single click by moving her finger to press on the "OK" key in center of navigation key 811 as shown in FIG. 8B.

At 1514, user device 103 may detect a confirmatory key press and transmit a signal to media client device 101 to indicate selection confirmation of the presently highlighted sector/menu item. The control circuit 1430 detects the actuation of single push detection element under navigation key 1180 at 1514 and communicates that event to a media client device.

At 1516, user device 103 may exit the arc menu UI. The media client device 101 may present a screen image corresponding to the user's menu selection.

Method 1600 shall be described with reference to FIGS. 1, 3B, 8B, 13A, 14, and 16. However, method 1600 is not limited to the example embodiment.

At 1602, media client device 101, may generate an image to be displayed. The image may be an interactive user dashboard or a typical menu screen.

At 1604, media client device 101, may receive from a user device 103 a signal to invoke an arc menu UI. For example, remote controller 1100 may detect a key press, a touch contact, or a gesture from the user to invoke arc menu and relay the user input to the media client device 101.

At 1606, media client device 101 may dynamically generate an arc menu UI to be displayed. The arc menu UI may include a plurality of menu items determined based on context as described above. For example, the plurality of menu items may be selected based the image displayed.

At 1608, media client device 101, may send to a user device 103 information relating to a configuration of the arc menu UI, including information about the layout or presentation of the arc menu UI, such information may relate to the number of sectors, the size of the sectors, the position of the sectors, and the menu item associated with each sector.

At 1610, media client device 101, may receive information identifying one of the menu items of the arc menu UI. For example, the information may be an identifier predetermined by the media client device 101 and user device 103.

At 1612, media client device 101, may perform an action based on the identified menu item. For example, the media client device may generate an updated arc menu UI that highlights a menu item that is presently selectable. The media client device 101 may repeatedly receive information identifying one of the menu items of the arc menu UI. For example, a user may change the user's finger position to touch or hover over another portion of the navigation key which corresponds to a second menu item. The media client device 101 may receive information identifying the second menu item and generate another updated arc menu UI that highlights the second menu item.

At 1614, media client 101 may receive from the user device 103 a signal confirming selection of the present menu item.

At 1616, media client 101 may generate a screen to be displayed based on the selected menu item. The screen may be another arc menu UI or a user dashboard interface or typical menu. The media client 101 may also exit arc menu UI.

Method 2500 shall be described with reference to FIGS. 1, 5A-C, 6, 8B, 13A, 14, and 20. However, method 2500 is not limited to the example embodiment.

At 2502, user device 103 may detect a signal to invoke a dialer in the arc menu UI for a character entry. For example, remote controller 1100 may detect a key press, a touch contact, or a gesture from the user to invoke an arc dialer to switch channels.

At 2504, user device 103 may transmit a signal to media client device 101 indicating a request for an arc dialer. For example, remote controller 1100 may send an instruction via transmit wireless signal 1442 to media client device 101 to invoke an arc dialer to be presented on display device 102. It is understood that a user may exit the arc menu UI at any time and return to 2502. If a user does not exit the arc menu UI, user device 103 automatically proceeds to 2506 and awaits further user interaction. Alternatively, a media client device 101 may automatically transition from an arc menu UI to an arc dialer. For example, referring to FIG. 6, when a user attempts to access a PIN restricted menu item and an arc dialer may be automatically displayed.

At 2506, user device 103 receives a signal from media client device 101 which may include information about the layout or presentation of the arc dialer, such information may relate to the number of positions or sectors.

At 2508, user device 103 may determine a correspondence between touch sensor points and the layout of the arc dialer. For example, the user device may generate a correspondence mapping based on the received arc dialer configuration information and angular regions detectable by a positional sensor. For example, control circuit 1430 of remote controller 1100 may configure a local representation (e.g., a map or table) based on the number of sectors and associated sensor data. A processor may determine for each sector an associated range of positional data from a positional sensor that would if detected correspond to the sector. Once a correspondence (e.g., calibrated mapping) is determined, a sector can be detected based on the positional information provided by a positional touch sensor. For example, if a remote controller receives from the media client device information indicating an arc dialer having six sectors, the remote controller may also partition an annular touch sensor into six sectors.

At 2510, user device 103 may determine relative positional information. Control circuit 1430 may use the determined correspondence (e.g. local representation) to determine a starting finger sector, an ending finger sector, a direction of the gesture based on the positional information provided by a capacitive touch sensor 1126. Alternatively, if a remote controller receives from the media client information indicating an arc dialer having six positions, control circuit 1430 may detect a starting finger angular position, an ending finger angular position, and a direction of the gesture and determine the relative number of angular position changes based on the number of positions.

At 2512, user device 103 may automatically send the determined relative positional information of user's finger movement to effect user input and UI animation. For example, a user may navigate along a third of the annular dimension of navigation key 1180. The control circuit may automatically transmit information which corresponds to the number of sectors or positions from the starting finger sector or position to the ending finger sector or position. The digit displayed in the character entry field may be updated based on the determined relative positional information.

At 2514, user device 103 may detect a confirmatory key press and transmit a signal to media client device 101 to indicate selection confirmation of the present digit displayed in the character entry field. The control circuit 1430 detects the actuation of single push detection element under navigation key 1180 at 2514 and communicates that event to a media client device.

At 2516, user device 103 may exit the arc menu UI or proceed to the next character entry. The media client device 101 may present a screen image corresponding to the user's menu selection.

Method 2600 shall be described with reference to FIGS. 1, 5A-C, 6, 8B, 13A, 14, and 21. However, method 2600 is not limited to the example embodiment.

At 2602, media client device 101, may generate an image to be displayed. The image may be a live television channel.

At 2604, media client device 101, may receive from a user device 103 a signal to invoke an arc dialer to, for example, switch a channel. For example, remote controller 1100 may detect a key press, a touch contact, or a gesture from the user to invoke arc menu and relay the user input to the media client device 101.

At 2606, media client device 101 may dynamically generate an arc dialer to be displayed. The arc dialer may include at least one character entry field. The arc dialer may be configured in a plurality of sectors or positions.

At 2608, media client device 101, may send to a user device 103 information relating to a configuration of the arc dialer, including information about the layout or presentation of the arc dialer, such information may relate to the number of sectors or positions. For example, the number of sectors or positions may correspond to the number of unique digits that may be inputted in the character entry field. The number of sectors or positions may also be fewer than the number of unique digits that may be inputted in the character entry field.

At 2610, media client device 101, may receive information indicating a relative change. For example, the information may indicate that the digit presently displayed in the character entry field should be incremented or decremented by a particular number.

At 2612, media client device 101, may perform an action based on the relative change information. For example, the media client device may generate an updated arc dialer display that updates the digit displayed in the character entry field based on the relative change information. The media client device 101 may repeatedly receive relative change information and update the digit displayed. The digit displayed in the character entry field may wrap around.

At 2614, media client 101 may receive from the user device 103 a signal confirming selection of the digit presently displayed.

At 2616, media client 101 may generate a screen to be displayed based on a next character entry. The screen may be another arc dialer. The media client 101 may also exit arc menu UI.

In the following, various aspects of this disclosure will be illustrated:

Example 1 is an apparatus for interacting with a graphical user interface. The apparatus may include a printed circuit board having a top surface and a bottom surface opposite the top surface, a plurality of push detection elements disposed on or over the top surface of the printed circuit board, wherein four push detection elements are arranged orthogonally from each other in the cardinal directions, a flexible pad layer having a top surface and a bottom surface opposite the top surface, wherein the flexible pad layer is disposed on or over the plurality of push detection elements, a navigation key member having a top surface and a bottom surface opposite the top surface, the navigation key member disposed over and covering the four push detection elements, wherein the bottom surface has an annular-shaped cavity, four plunger members, each one of the four plunger members disposed above a respective one of the four push detection elements and configured to actuate a respective push detection element when a corresponding plunger member is actuated and at least one post member disposed in an angular region between two plunger members of adjacent cardinal directions.

In Example 2, the subject matter of Example 1 may optionally include wherein the four plunger members include a first pair of diametrically opposed plunger members each disposed at a first radial distance from a center point of the navigation key and a second pair of diametrically opposed plunger members each disposed at a second radial distance from the center point, wherein the first radial distance and the second radial distance are different.

In Example 3, the subject matter of Example 2 may optionally include wherein the first radial distance is greater than the second radial distance, wherein each plunger member has a top surface and a bottom surface opposite the top surface, wherein the top surfaces of the plunger members of the first pair are coupled to the bottom surface of the navigation key, wherein the top surfaces of the plunger members of the second pair are spaced apart from the bottom surface of the navigation key.

In Example 4, the subject matter of any of Examples 1 to 3 may optionally include wherein the at least one post member includes four post members, the four post members arranged radially at the angular directions of 45 degrees, 135 degrees, 225 degrees, and 315 degrees, respectively.

In Example 5, the subject matter of Example 4 may optionally include wherein the four post members are each arranged at a third radial distance from the center point, wherein the third radial distance is less than the first radial distance and greater than the second radial distance.

In Example 6, the subject matter of Example 5 may optionally include wherein the four plungers are cylindrically shaped, wherein each of the first pair of diametrically opposed plunger members have a first radius and each of the second pair of diametrically opposed plunger members having a second radius, wherein the first radius and the second radius are different.

In Example 7, the subject matter of any one of Examples 1 to 5 may optionally include wherein the navigation key member is circular.

In Example 8, the subject matter of Example 1 may optionally include wherein the navigation key member is circular so that when a force is applied at any point on the top surface of the navigation key member a corresponding pivot point is created at a point on the edge of the navigation key member that is diametrically opposed from the point where the force is applied, and the at least one post disposed is configured so that a first distance between the pivot point and first plunger member and a second distance between the pivot point and the second plunger member are never equal.

In Example 9, the subject matter of Example 1 may optionally include a confirmation key member having a top surface and a bottom surface, wherein the navigation key member includes a central through hole and the confirmation key is disposed in the central through hole.

In Example 10, the subject matter of Example 1 may optionally include a touch sensor arranged on or over the top surface of the printed circuit board, and under the navigation key member, wherein the touch sensor is configured to provide information about a position of an object that is contacting or hovering over the top surface of the navigation key member and/or the surface of the confirmation key.

In Example 11, the subject matter of Example 2 may optionally include a cursor guide element, wherein the cursor guide element is configured to be received into the annular-shaped cavity through the bottom surface of the navigation key member so as to form a nested assembly, wherein the four plungers and the at least one post member is integral with the cursor guide element.

In Example 12, the subject matter of Example 11 may optionally include wherein the cursor guide element further includes: a circular base, and four supporting arms extending radially outward from the circular base, wherein the four supporting arms are symmetrically distributed around the circular base, wherein the at least one post includes four posts, each post is disposed on a respective one of the four supporting arms.

In Example 13, the subject matter of Example 12 may optionally include wherein the cursor guide element further includes: four leaf spring members, wherein each one of the four plunger members is coupled to the circular base by a respective one of the four leaf springs.

In Example 14, the subject matter of Example 4 may optionally include wherein each post has a top surface and a bottom surface opposite the top surface, wherein the top surface of each post faces the navigation key member, and the bottom surface of each post faces the flexible pad layer, wherein the top surface of each post is in direct contact with the bottom surface of the navigation key member and the bottom surface of each post is spaced apart from the top surface of the flexible pad layer.

In Example 15, the subject matter of Example 14 may optionally include wherein the space between the bottom surface of each post and the top surface of the flexible pad layer is about 0.2 mm.

In Example 16, the subject matter of Example 2 may optionally include wherein the first radial distance is greater than the second radial distance, wherein the first pair of diametrically opposed plunger members are integral with the navigation key, wherein each plunger member of the first pair extends vertically downward from the bottom surface of the navigation key, wherein the second pair of diametrically opposed plunger members are integral with the flexible pad layer, wherein each plunger member of the second pair extends vertically upward from the top surface of the flexible layer.

In Example 17, the subject matter of Example 16, may optionally include wherein the four posts are integral with the flexible pad layer, wherein each post extends vertically upward from the top surface of the flexible layer.

Example 18 is a method for a graphical user interface. The method may include: generating an image to be displayed, receiving a user input from a user device, generating, in response to the user input, a custom menu to be displayed over the image, wherein the custom menu includes a plurality of menu items that are determined based at least on the image, wherein the custom menu includes a plurality of sectors, where each respective one of the sectors is associated with a respective one of the plurality of menu items, wherein the plurality of sectors are arranged radially and a size and an angular position of each sector is determined based a characteristic of the respective associated menu item, transmitting, to the user device, information including the number of sectors, the size of each sector, the angular position of each sector, and the menu item associated with each sector, receiving, from the user device, information identifying one of the plurality of sectors, and performing an action based on the identified sector.

In Example 19, the subject matter of Example 18 may optionally include wherein the angular position of each sector is determined based on at least one of an importance, a relevance, a frequency of use, and a relation to another menu item of the respective associated menu item.

In Example 20, the subject matter of Example 18 may optionally include wherein the size of each sector is determined based on at least one of an importance, a relevance, a frequency of use, and a relation to another menu item of the respective associated menu item.

In Example 21, the subject matter of Example 18 may optionally include wherein the image is a menu screen including a plurality of menu items.

In Example 22, the subject matter of Example 21 may optionally include wherein the plurality of menu items of the custom menu includes one or more menu items of the menu screen and one or more items that are not of the menu screen.

In Example 23, the subject matter of Example 22 may optionally include wherein the one or more items that are not of the menu screen are related to the one or more menu items of the menu screen.

In Example 24, the subject matter of Example 18 may optionally include wherein the plurality of menu items of the custom menu is a subset of the plurality of menu items of the menu screen, wherein the subset is determined based on a usage characteristic of each menu item.

In Example 25, the subject matter of Example 24 may optionally include wherein the usage characteristic is at least one of: an importance, a relevance, a frequency of use, and a relation to another menu item of the plurality of menu items of the menu screen.

In Example 26, the subject matter of Example 18 may optionally include wherein performing an action based on the identified sector includes generating an updated custom menu to be displayed, wherein the updated custom menu includes a visual indication corresponding to the identified sector.

In Example 27, the subject matter of Example 18 may optionally include wherein performing an action based on the identified sector includes generating a second custom menu to be displayed, wherein the second custom menu includes a plurality of menu items related to the menu item associated the identified sector.

Example 28 is a method for a graphical user interface. The method may include: transmitting, from a user device to a media device, a first user input based on an image generated by the media device, receiving, from a media device, information related to a custom menu generated by the media device for viewing by the user, wherein the custom menu includes a plurality of menu items that are determined based at least on the image, wherein the custom menu includes a plurality of sectors, where each respective one of the sectors is associated with a respective one of the plurality of menu items, wherein the plurality of sectors are arranged radially and a size and an angular position of each sector is determined based a characteristic of the respective associated menu item, wherein the information includes the number of sectors, the size of each sector, the angular position of each sector, and the menu item associated with each sector, detecting, from a positional sensor of the user device, positional information corresponding to a second user input, determining a correspondence between the second user input and a sector of the custom menu based on the detected positional information and the received information related to the custom menu, and transmitting, to the media device, information identifying the sector corresponding to the second user input.

In Example 29, the subject matter of Example 28 may optionally include detecting, from a push detection sensor of the user device, a third user input, and transmitting, to the media device, information confirming selection of the identified sector.

Example 30 is a method for a graphical user interface. The method may include: generating a dialer menu interface to be displayed, wherein the dialer menu interface includes at least one character entry field displaying a character, wherein the dialer menu interface includes a dialer configured in a number of sectors or positions, transmitting, to the user device, information including the number of sectors or positions of the dialer, receiving, from the user device, information indicating a relative change to the character determined based on the number of sectors or positions of the dialer, and performing an action based on the relative change information.

Example 31 is a method for a graphical user interface. The method may include: receiving, from a media device, information including the number of sectors of a dialer of a dialer menu interface, wherein the dialer menu interface includes at least one character entry field displaying a character, detecting, from a positional touch sensor of a user device, a first angular position corresponding to a beginning of a user contact and a second angular position corresponding to an ending of a user contact, determining a correspondence between the first angular position and a sector of the dialer and determining a correspondence between the second angular position and another sector of the dialer, determining a relative change information of the character displayed in the at least one character entry field based on a number of sectors between the sector and the another sector, transmitting, to the media device, the relative change information.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for interacting with a graphical user interface, comprising:
   a printed circuit board having a top surface and a bottom surface opposite the top surface;
   a plurality of push detection elements disposed on or over the top surface of the printed circuit board, wherein four push detection elements are arranged orthogonally from each other in the cardinal directions;
   a flexible pad layer having a top surface and a bottom surface opposite the top surface, wherein the flexible pad layer is disposed on or over the plurality of push detection elements;
   a navigation key member having a top surface and a bottom surface opposite the top surface, the navigation key member disposed over and covering the four push detection elements, wherein the bottom surface has an annular-shaped cavity;
   four plunger members, each one of the four plunger members disposed above a respective one of the four push detection elements and configured to actuate a respective push detection element when a corresponding plunger member is actuated; and
   at least one post member disposed in an angular region between two plunger members of adjacent cardinal directions,
   wherein the four plunger members include a first pair of diametrically opposed plunger members each disposed at a first radial distance from a center point of the navigation key and a second pair of diametrically opposed plunger members each disposed at a second radial distance from the center point, wherein the first radial distance and the second radial distance are different, wherein the first radial distance is greater than the second radial distance, wherein each plunger member has a top surface and a bottom surface opposite the top surface, wherein the top surfaces of the plunger members of the first pair are coupled to the bottom surface of the navigation key, wherein the top surfaces of the plunger members of the second pair are spaced apart from the bottom surface of the navigation key, wherein the at least one post member includes four post members, the four post members arranged radially and distributed angularly at angular directions of about 30 to 60 degrees, about 120 to 150 degrees, about 210 to 240 degrees, and about 300 to 330 degrees, respectively, wherein the four post members are each arranged at a third radial distance from the center point, wherein the third radial distance is less than the first radial distance and greater than the second radial distance.

2. The apparatus of claim 1, wherein the four plungers are cylindrically shaped, wherein each of the first pair of diametrically opposed plunger members have a first radius and each of the second pair of diametrically opposed plunger members having a second radius, wherein the first radius and the second radius are different.

3. The apparatus of claim 2, wherein the navigation key member is circular.

4. The apparatus of claim 1, wherein the navigation key member is circular so that when a force is applied at any point on the top surface of the navigation key member a corresponding pivot point is created at a point on the edge of the navigation key member that is diametrically opposed from the point where the force is applied, and the at least one post disposed is configured so that a first distance between the pivot point and first plunger member and a second distance between the pivot point and the second plunger member are never equal.

5. The apparatus of claim 1, further comprising:

a confirmation key member having a top surface and a bottom surface, wherein the navigation key member includes a central through hole and the confirmation key is disposed in the central through hole.

6. The apparatus of claim 1, further comprising:

a touch sensor arranged on or over the top surface of the printed circuit board, and under the navigation key member, wherein the touch sensor is configured to provide information about a position of an object that is contacting or hovering over the top surface of the navigation key member and/or the surface of the confirmation key.

7. The apparatus of claim 1, further comprising a cursor guide element, wherein the cursor guide element is configured to be received into the annular-shaped cavity through the bottom surface of the navigation key member so as to form a nested assembly, wherein the four plungers and the at least one post member is integral with the cursor guide element.

8. The apparatus of claim 7, wherein the cursor guide element further comprises:

a circular base; and four supporting arms extending radially outward from the circular base, wherein the four supporting arms are symmetrically distributed around the circular base, wherein the at least one post includes four posts, each post is disposed on a respective one of the four supporting arms.

9. The apparatus of claim 8, wherein the cursor guide element further comprises:

four leaf spring members, wherein each one of the four plunger members is coupled to the circular base by a respective one of the four leaf springs.

10. The apparatus of claim 1, wherein the first radial distance is greater than the second radial distance, wherein the first pair of diametrically opposed plunger members are integral with the navigation key, wherein each plunger member of the first pair extends vertically downward from the bottom surface of the navigation key, wherein the second pair of diametrically opposed plunger members are integral with the flexible pad layer, wherein each plunger member of the second pair extends vertically upward from the top surface of the flexible layer.

11. The apparatus of claim 10, wherein the four posts are integral with the flexible pad layer, wherein each post extends vertically upward from the top surface of the flexible layer.

12. The apparatus of claim 1, wherein each post has a top surface and a bottom surface opposite the top surface, wherein the top surface of each post faces the navigation key member, and the bottom surface of each post faces the flexible pad layer, wherein the top surface of each post is in direct contact with the bottom surface of the navigation key member and the bottom surface of each post is spaced apart from the top surface of the flexible pad layer.

13. The apparatus of claim 12, wherein the space between the bottom surface of each post and the top surface of the flexible pad layer is about 0.2 mm.

* * * * *